(12) United States Patent
Zhu et al.

(10) Patent No.: US 10,719,423 B2
(45) Date of Patent: Jul. 21, 2020

(54) APPARATUS AND METHOD FOR APPLICATION DEPLOYMENT ASSESSMENT

(71) Applicant: Futurewei Technologies, Inc., Plano, TX (US)

(72) Inventors: Xiaoyun Zhu, Cupertino, CA (US); Jinzhong Zhang, Santa Clara, CA (US); Huichao Zhao, Fremont, CA (US); Sid Askary, San Jose, CA (US); Daniel Chen, San Jose, CA (US); CJ Hersh, Campbell, CA (US); Yue Chen, Fremont, CA (US); Shu Zhang, Plano, TX (US); Jing Ye, Ningbo (CN)

(73) Assignee: Futurewei Technologies, Inc., Plano, TX (US)

( * ) Notice: Subject to any disclaimer, the term of this patent is extended or adjusted under 35 U.S.C. 154(b) by 115 days.

(21) Appl. No.: 15/648,204

(22) Filed: Jul. 12, 2017

(65) Prior Publication Data

US 2019/0018671 A1  Jan. 17, 2019

(51) Int. Cl.
*G06F 11/34* (2006.01)
*H04L 12/26* (2006.01)
(Continued)

(52) U.S. Cl.
CPC ............ *G06F 11/3457* (2013.01); *G06F 8/60* (2013.01); *G06F 11/3452* (2013.01);
(Continued)

(58) Field of Classification Search
CPC ............. H04L 67/1002; H04L 67/1004; H04L 67/1008; H04L 67/101;
(Continued)

(56) References Cited

U.S. PATENT DOCUMENTS 8,370,915 B2 * 2/2013 Carter ................... G06F 21/33
  726/10
9,413,619 B2 * 8/2016 Akolkar ............... H04L 41/147
(Continued)

OTHER PUBLICATIONS

RightScale, "It As a Cloud Services Broker: Provide Self-Service Access to Cloud," 2014, pp. 1-23, retrieved from http://www.rightscale.com/lp/it-as-a-cloud-services-broker-white-paper.

*Primary Examiner* — Todd Aguilera
(74) *Attorney, Agent, or Firm* — Schwegman Lundberg & Woessner, P.A.

(57) ABSTRACT

An apparatus and associated method are provided for application deployment assessment. In use, a plurality of deployment parameters associated with one or more applications, and a workload profile are received. Further, an application deployment specification is generated, based on the workload profile and the deployment parameters. Still yet, a type of one or more orchestrators on one or more systems is identified. The application deployment specification is processed, based on the identified type of the one or more orchestrators on the one or more systems. Further, the one or more processors execute the instructions to deploy, via an application program interface (API), the one or more applications to the one or more orchestrators on at least one of the one or more systems, and at least one workload generator to at least one of the one or more systems, utilizing the processed application deployment specification. Operational data is collected from one or more monitoring agents on the one or more systems. One or more statistics are generated for assessing the deployment of the one or more applications, based on the operational data.

32 Claims, 21 Drawing Sheets

(51) Int. Cl.
  *G06F 8/60* (2018.01)
  *H04L 12/24* (2006.01)
  *G06F 8/76* (2018.01)

(52) U.S. Cl.
  CPC .......... *H04L 41/16* (2013.01); *H04L 41/5009* (2013.01); *H04L 43/04* (2013.01); *H04L 43/0817* (2013.01); *G06F 8/76* (2013.01); *G06F 11/3414* (2013.01); *H04L 41/046* (2013.01); *H04L 41/22* (2013.01); *H04L 41/5054* (2013.01); *H04L 43/12* (2013.01)

(58) Field of Classification Search
  CPC ....... H04L 67/1012–1034; H04L 67/02; H04L 43/04; H04L 43/0817; H04L 67/1025; H04L 67/1029; H04L 41/046; H04L 41/16; H04L 41/22; H04L 41/5009; H04L 41/5025; H04L 41/5054; H04L 43/12; G06F 8/60–66; G06F 8/71; G06F 8/76; G06F 21/50; G06F 11/3006; G06F 11/301; G06F 11/34–3461
  See application file for complete search history.

(56) References Cited

U.S. PATENT DOCUMENTS

| | | | |
|---|---|---|---|
| 10,356,206 B2* | 7/2019 | Chen | H04L 67/32 |
| 2008/0098462 A1* | 4/2008 | Carter | G06F 21/33 |
| | | | 726/4 |
| 2014/0089495 A1* | 3/2014 | Akolkar | H04L 41/147 |
| | | | 709/224 |
| 2017/0134301 A1* | 5/2017 | Chen | H04L 67/10 |

* cited by examiner

```
0001    apiVersion: v1                                              0081            protocol: TCP
0002    kind: Secret                                                0082            name: http                          ╱‾660
0003    metadata:                                                   0083    selector:
0004    name: dockerhub.registry                                    0084            name: webpods
0005    data:                                                       0085    ---
0006    .dockerconfigjson: <key-is-hided>                           0086    apiVersion: extensions/v1beta1
0007    type: kubernetes.io/dockerconfigjson                        0087    kind: Deployment
0008    ---                                                         0088    metadata:
0009    # A headless service to create DNS records                  0089    name: webrc
0010    apiVersion: v1                                              0090    spec:
0011    kind: Service                                               0091    replicas: 1
0012    metadata:                                                   0092    template:
0013    annotations:                                                0093            metadata:
0014            service.alpha.kubernetes.io/tolerate-unready-endpoints: "true"   0094            labels:
0015    name: db                                                    0095                    name: webpods
0016    labels:                                                     0096                    tier: frontend
0017            app: mysql                                          0097            spec:
0018    spec:                                                       0098            restartPolicy: Always
0019    ports:                                                      0099            imagePullSecrets:
0020    - port: 3306                                                0100            - name: "dockerhub.registry"
0021            name: mysql                                         0101            containers:
0022    clusterIP: None                                             0102            - image: masonhale/acmeair:latest
0023    selector:                                                   0103                    name: web
0024            app: mysql                                          0104                    ports:
0025    ---                                                         0105                    - containerPort: 8080
0026    apiVersion: v1                                              0106    ---
0027    kind: ReplicationController                                 0107    apiVersion: v1
0028    metadata:                                                   0108    kind: Service
0029    name: "k8s-mysql"                                           0109    metadata:
0030    labels:                                                     0110    name: nginx
0031            name: "lbl-k8s-mysql"                               0111    spec:
0032    spec:                                                       0112    type: NodePort
0033    replicas: 1                                                 0113    ports:
0034    containers:                                                 0114    - port: 80
0035            - image: mysql:latest                               0115            targetPort: 80
0036            name: "mysql"                                       0116            nodePort: 30181
0037            env:                                                0117            protocol: TCP
0038                    - name: "MYSQL_ROOT_PASSWORD"               0118            name: nginx0
0039                    value: "root"                               0119    selector:
0040    ports:                                                      0120            name: nginxpo
0041            - containerPort: 3306                               0121    ---
0042            name: "mysql"                                       0122    apiVersion: extensions/v1beta1
0043    volumeMounts:                                               0123    kind: Deployment
0044            - name: "k8s-mysql-storage"                         0124    metadata:
0045            mountPath: "/var/lib/mysql"                         0125    name: nginx
0046    volumes:                                                    0126    spec:
0047    - name: "k8s-mysql-storage"                                 0127    replicas: 1
0048            emptyDir: {}                                        0128    template:
0049    ---                                                         0129            metadata:
0050    apiVersion: batch/v1                                        0130            labels:
0051    kind: Job                                                   0131                    name: nginxpo
0052    metadata:                                                   0132            spec:
0053    name: acmeairdbloader                                       0133            restartPolicy: Always
0054    spec:                                                       0134            imagePullSecrets:
0055    template:                                                   0135            - name: "dockerhub.registry"
0056            metadata:                                           0136            containers:
0057            name: acmeair-dbloader                              0137            - name: nginx
0058            spec:                                               0138                    image: nginx:latest
0059            restartPolicy: Never                                0139                    imagePullPolicy: "Always"
0060            imagePullSecrets:                                   0140                    ports:
0061            - name: "dockerhub.registry"                        0141                    - containerPort: 80
0062            nodeSelector:                                       0142                    - containerPort: 443
0063                    stack: dryrun
0064            containers:
0065            - name: acmeair-dbloader
0066                    image: mysql-loader:0.3
0067                    env:
0068                    - name: MYSQL_PORT_3306_TCP_ADDR
0069                            value: db
0070                    - name: MYSQL_ENV_MYSQL_ROOT_PASSWORD
0071                            value: root
0072    ---
0073    apiVersion: v1
0074    kind: Service
0075    metadata:
0076    name: acmeairapp
0077    spec:
0078    ports:
0079    - port: 8080
0080            targetPort: 8080
```

```
0001    apiVersion: v1
0002    kind: ReplicationController
0003    metadata:
0004    name: jmeter
0005    spec:
0006    replicas: 1
0007    selector:
0008            name: jmeter
0009    template:
0010            metadata:
0011            labels:
0012                    name: jmeter
0013            spec:
0014            imagePullSecrets:
0015            - name: "dockerhub.registry"
0016            nodeSelector:
0017                    stack: loadgenerator
0018            restartPolicy: Always
0019            containers:
0020            - name: jmeter
0021                    image: cirit/jmeter:master
```

FIG. 6D

```
001  [
002    {
003        "kind": "ReplicationController",
004        "name": "k8s-mysql",
005        "replicas": 1,
006        "podConfig": {
007         "containersConfig": {
008             "mysql": {
009                 "cpu_quota": 1000000,
010                 "mem_limit": 1073741824
011             }
012         }
013        }
014    },
015    {
016        "kind": "Deployment",
017        "name": "webrc",
018        "replicas": 2,
019        "podConfig": {
020         "containersConfig": {
021             "web": {
022                 "cpu_quota": 1000000,
023                 "mem_limit": 1287651328
024             }
025         }
026        }
027    },
028    {
029        "kind": "Deployment",
030        "name": "nginx",
031        "replicas": 1,
032        "podConfig": {
033         "containersConfig": {
034             "nginx": {
035                 "cpu_quota": 1000000,
036                 "mem_limit": 1287651328
037             }
038         }
039        }
040    }
041  ]
```

```
001    apiVersion: v1
002    kind: Secret
003    metadata:
004      name: dockerhub.registry
005    data:
006      .dockerconfigjson: <key-is-hided>
007    type: kubernetes.io/dockerconfigjson
008    ---
009    # A headless service to create DNS records
010    apiVersion: v1
011    kind: Service
012    metadata:
013      annotations:
014        service.alpha.kubernetes.io/tolerate-unready-endpoints: "true"
015      name: db
016      labels:
017        app: mysql
018    spec:
019      ports:
020      - port: 3306
021        name: mysql
022      clusterIP: None
023      selector:
024        app: mysql
025    ---
026    apiVersion: v1
027    kind: ReplicationController
028    metadata:
029      name: "k8s-mysql"
030      labels:
031        name: "lbl-k8s-mysql"
032    spec:
033      replicas: 1
034      containers:
035      - image: mysql:latest
036        name: "mysql"
037        env:
038        - name: "MYSQL_ROOT_PASSWORD"
039          value: "root"
040        resources:
041          limits:
042            cpu: 1000m
043            memory: 1024Mi
044        ports:
045        - containerPort: 3306
046          name: "mysql"
047        volumeMounts:
048        - name: "k8s-mysql-storage"
049          mountPath: "/var/lib/mysql"
050      volumes:
051      - name: "k8s-mysql-storage"
052        emptyDir: {}
053    ---
054    apiVersion: batch/v1
055    kind: Job
056    metadata:
057      name: acmeairdbloader
058    spec:
059      template:
060        metadata:
061          name: acmeair-dbloader
062        spec:
063          restartPolicy: Never
064          imagePullSecrets:
065          - name: "dockerhub.registry"
066          nodeSelector:
067            stack: dryrun
068          containers:
069          - name: acmeair-dbloader
070            image: mysql-loader:0.3
071            env:
072            - name: MYSQL_PORT_3306_TCP_ADDR
073              value: db
074            - name: MYSQL_ENV_MYSQL_ROOT_PASSWORD
075              value: root
076    ---
077    apiVersion: v1
078    kind: Service
079    metadata:
080      name: acmeairapp
081    spec:
082      ports:
083      - port: 8080
084        targetPort: 8080
085        protocol: TCP
086        name: http
087      selector:
088        name: webpods
089    ---
090    apiVersion: extensions/v1beta1
091    kind: Deployment
092    metadata:
093      name: webrc
094    spec:
095      replicas: 2
096      template:
097        metadata:
098          labels:
099            name: webpods
100            tier: frontend
101        spec:
102          restartPolicy: Always
103          imagePullSecrets:
104          - name: "dockerhub.registry"
105          containers:
106          - image: masonhale/acmeair:latest
107            name: web
108            ports:
109            - containerPort: 8080
110            resources:
111              limits:
112                cpu: 1000m
113                memory: 1228Mi
114    ---
115    apiVersion: v1
116    kind: Service
117    metadata:
118      name: nginx
119    spec:
120      type: NodePort
121      ports:
122      - port: 80
123        targetPort: 80
124        nodePort: 30181
125        protocol: TCP
126        name: nginx0
127      selector:
128        name: nginxpo
129    ---
130    apiVersion: extensions/v1beta1
131    kind: Deployment
132    metadata:
133      name: nginx
134    spec:
135      replicas: 1
136      template:
137        metadata:
138          labels:
139            name: nginxpo
140        spec:
141          restartPolicy: Always
142          imagePullSecrets:
143          - name: "dockerhub.registry"
144          containers:
145          - name: nginx
146            image: nginx:latest
147            imagePullPolicy: "Always"
148            ports:
149            - containerPort: 80
150            - containerPort: 443
151            resources:
152              limits:
153                cpu: 1000m
154                memory: 1228Mi
```

```
001    nginx:
002    scale: 1
003    webrc:
004    scale: 2
005    db:
```

```
001     # the apps stack
002     db:
003     restart: always
004     labels:
005             io.rancher.scheduler.affinity:host_label: stack=apps,CLOUDPROVIDERSELECTOR
006             io.rancher.container.hostname_override: container_name
007             io.rancher.container.pull_image: always
008     image: mysql:5
009     ports:
010             - 3306:3306
011     environment:
012             - MYSQL_ROOT_PASSWORD=root
013     volumes:
014             - /var/lib/mysql:/var/lib/mysql
015     mem_limit: 1073741824
016     memswap_limit: 1073741824
017     cpu-period: 1000000
018     cpu-quota: 1000000
019
020
021     webrc:
022     restart: always
023     labels:
024             io.rancher.scheduler.affinity:host_label: stack=apps,CLOUDPROVIDERSELECTOR
025             io.rancher.container.hostname_override: container_name
026             #io.rancher.scheduler.affinity:container_label_soft: io.rancher.stack_service.name=APP-NAME-PLACEHOLDER/db
027             io.rancher.container.pull_image: always
028     image: masonhale/acmeair:latest
029     links:
030             - db
031     mem_limit: 1287651328
032     memswap_limit: 1287651328
033     cpu-period: 1000000
034     cpu-quota: 1000000
035
036     nginx:
037     restart: always
038     labels:
039             io.rancher.scheduler.affinity:host_label: stack=apps,CLOUDPROVIDERSELECTOR
040             io.rancher.scheduler.affinity:container_label_ne: io.rancher.stack_service.name=$${stack_name}/$${service_name}
041             io.rancher.container.hostname_override: container_name
042             #io.rancher.scheduler.affinity:container_label_soft: io.rancher.stack_service.name=APP-NAME-PLACEHOLDER/db
043             io.rancher.container.pull_image: always
044     image: nginx:latest
045     links:
046             - webrc:app
047     external_links:
048             - devops/influxdb:influxdb
049             - devops/kafka:kafka
050     environment:
051             - APP_NAME=APP-NAME-PLACEHOLDER
052     ports:
053             - 80:80
054     mem_limit: 1287651328
055     memswap_limit: 1287651328
056     cpu-period: 1000000
057     cpu-quota: 1000000
```

APPARATUS AND METHOD FOR APPLICATION DEPLOYMENT ASSESSMENT

FIELD OF THE INVENTION

The present invention relates to application deployment systems, and more particularly to application deployment assessment techniques.

BACKGROUND

The wide adoption of operating system (OS) containers has led to the rise of a class of applications referred to as cloud-native applications. These applications typically adopt a microservices architecture, where each application component is packaged as a microservice with its own API and typically runs as a separate instance, or "container." Such containers typically wrap a piece of software in a complete file system that contains everything needed to run including, but not limited to code, runtime parameters, system tools, system libraries, etc.

Further, container orchestration technologies provide additional assistance in the deployment and execution of cloud-native applications on a cluster of hosts. While such containers have largely simplified the building, shipping, and execution of cloud-native applications, deployment and capacity planning in connection with such applications still require a significant amount of resources. Specifically, when an application operator needs to deploy a cloud-native application, several questions arise including, but not limited to: to which cloud provider and to which location to deploy the application, what scaling factor to use for each application component, what initial resource configuration to use for each container, etc.

It is nontrivial to determine suitable answers to these questions, especially for business critical applications with essential operational requirements regarding cost, availability, and performance. To date, the process of addressing the foregoing during application deployment can be highly labor-intensive, inaccurate, and/or error-prone.

SUMMARY

An apparatus is provided including a processing device comprising a non-transitory memory storing instructions, and one or more processors in communication with the non-transitory memory. The one or more processors execute the instructions to receive a plurality of deployment parameters associated with one or more applications, and a workload profile. Further, an application deployment specification is generated, based on the workload profile and the deployment parameters. Still yet, a type of one or more orchestrators on one or more systems is identified. The application deployment specification is processed, based on the identified type of the one or more orchestrators on the one or more systems. Further, the one or more processors execute the instructions to deploy, via an application program interface (API), the one or more applications to the one or more orchestrators on at least one of the one or more systems, and at least one workload generator to at least one of the one or more systems, utilizing the processed application deployment specification. Operational data is collected from one or more monitoring agents on the one or more systems. One or more statistics are generated for assessing the deployment of the one or more applications, based on the operational data.

Also provided is a method that involves receiving an application specification file associated with one or more applications, a plurality of deployment parameters associated with the one or more applications, and a workload profile. Further, an application deployment specification is generated, based on the workload profile and the deployment parameters. Still yet, a type of one or more orchestrators on one or more systems is identified. The application deployment specification is processed, based on the identified type of the one or more orchestrators on the one or more systems. Further, the one or more applications are deployed, via an API, to the one or more orchestrators on at least one of the one or more systems, and at least one workload generator to at least one of the one or more systems, utilizing the processed application deployment specification. Operational data is collected from one or more monitoring agents on the one or more systems. One or more statistics are generated for assessing the deployment of the one or more applications, based on the operational data.

Further provided is a non-transitory computer-readable media storing computer instructions that when executed by one or more processors, cause the one or more processors to receive an application specification file associated with one or more applications, a plurality of deployment parameters associated with the one or more applications, and a workload profile. Further, an application deployment specification is generated, based on the workload profile and the deployment parameters. Still yet, a type of one or more orchestrators on one or more systems is identified. The application deployment specification is processed, based on the identified type of the one or more orchestrators on the one or more systems. Further, the one or more applications are deployed, via an API, to the one or more orchestrators on at least one of the one or more systems, and at least one workload generator to at least one of the one or more systems, utilizing the processed application deployment specification. Operational data is collected from one or more monitoring agents on the one or more systems. One or more statistics are generated for assessing the deployment of the one or more applications, based on the operational data.

Optionally, in any of the preceding embodiments, the one or more orchestrators on the one or more systems may include a first orchestrator of a first type on a first system and a second orchestrator of a second type on a second system. As an option, the application deployment specification may be processed to accommodate differences between the first orchestrator and the second orchestrator.

Optionally, in any of the preceding embodiments, the application deployment specification may be validated, where the application deployment specification is conditionally deployed based on the validation.

Optionally, in any of the preceding embodiments, the deployment of the one or more applications may be validated, based on the one or more statistics.

Optionally, in any of the preceding embodiments, an additional application deployment specification may be generated. Further, the additional application deployment specification may be deployed for generating an additional one or more statistics for comparison with the one or more statistics.

Optionally, in any of the preceding embodiments, the one or more statistics may be aggregated into a single score for assessing the deployment of the one or more applications.

Optionally, in any of the preceding embodiments, a plurality of the application deployment specifications may be generated, based on the application deployment specification. Further, a subset of the plurality of the application deployment specifications may be selected. Still yet, the subset of the plurality of the application deployment specifications may be deployed, for generating a first set of the one or more statistics in connection therewith.

Optionally, in any of the preceding embodiments, additional deployment specifications may also be generated, based on the one or more statistics. Further, a subset of the additional deployment specifications may be selected, such that the subset of the additional deployment specifications may be deployed, for generating a second set of the one or more statistics.

Optionally, in any of the preceding embodiments, it may be determined whether a similarity in connection with the first set of the one or more statistics and the second set of the one or more statistics, is within a predetermined threshold. In an event that it is determined that the similarity is within the predetermined threshold, a deployment specification recommendation may be made to a user.

Optionally, in any of the preceding embodiments, the deployment specification recommendation may include a portion of: the subset of the plurality of the application deployment specifications, and/or the subset of the additional deployment specifications.

Optionally, in any of the preceding embodiments, the plurality of the application deployment specifications may be generated based on one or more models. As various options, the one or more modules may include: a combination of a classification model and a regression model, a classification model, a gradient-based model, and/or a neighborhood-based model.

Optionally, in any of the preceding embodiments, the one or more models may be trained, utilizing at least a portion of the one or more statistics.

One or more of the foregoing features may thus afford a more automated application deployment assessment. This may be accomplished, for example, by pre-processing (e.g. integrating, etc.) the various input by a deployment specification composer before distribution via an API server, so that such various input need not necessarily be separately and/or manually processed to configure various aspects of application/workload generator deployment. This may, in turn, result in additional efficiency and/or effectiveness in application deployment assessment (as well deployment itself) that would otherwise be foregone in systems that lack such capability. It should be noted that the aforementioned potential advantages are set forth for illustrative purposes only and should not be construed as limiting in any manner.

BRIEF DESCRIPTION OF THE DRAWINGS

FIG. 6C illustrates an application specification file, in accordance with an embodiment.

FIG. 6D illustrates a workload profile, in accordance with an embodiment.

FIG. 6E illustrates deployment parameters, in accordance with an embodiment.

FIG. 6F illustrates a deployment specification, in accordance with an embodiment.

FIG. 6H illustrates a modified deployment specification for the purpose of accommodating a particular type of orchestrator, namely a RANCHER-composer-type orchestrator.

DETAILED DESCRIPTION

Figure 1:
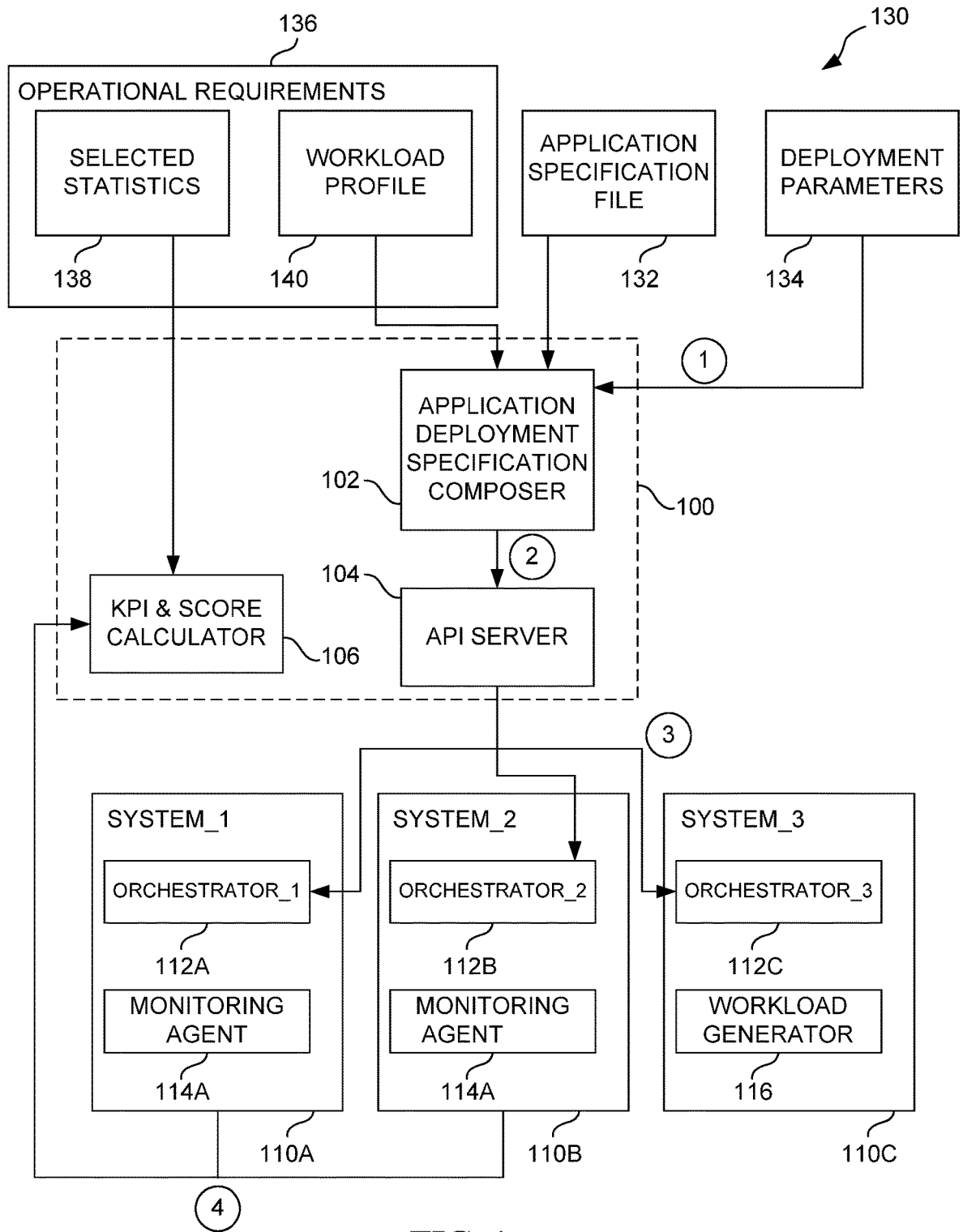
FIG. 1 illustrates an apparatus for application deployment, in accordance with an embodiment.

FIG. 1 illustrates an apparatus 100 for application deployment, in accordance with an embodiment. As shown, the apparatus 100 includes an application deployment specification composer 102 in communication with an application program interface (API) server 104 and a key performance indicator (KPI) & score calculator 106. It should be noted that the foregoing components may include any hardware and/or software that is configured for performing the functionality to be described below. Further, while the deployment specification composer 102, API server 104, and KPI & score calculator 106 are shown to be locally coupled in the apparatus 100 (and possibly even integrated), it should be noted that any of such components may be either locally or remotely connected to any other component, as desired.

The apparatus 100 is further configured for communicating with a plurality of systems 110A, 110B, 110C including orchestrators 112A, 112B, 112C. Further, one or more of the systems 110A, 110B, 110C is equipped with monitoring agents 114A, 114B, and/or a workload generator 116. Similar to the components of the apparatus 100, the system components may include any hardware and/or software that is configured for performing the functionality to be described below, and may be remotely and/or locally coupled (and even possibly integrated). In use, the apparatus 100 is configured for receiving various inputs 130 including an application specification file 132, deployment parameters 134, and operational requirements 136 including, but not limited to selected statistics 138 and a workload profile 140. More information will now be set forth regarding the foregoing components and the interoperability thereof.

In the context of the present description, the deployment specification composer 102 is configured for generating an application deployment specification based on one or more of the inputs 130. In order to accomplish this, the deployment specification composer 102 is configured to receive, at the very least, the application specification file 132, the deployment parameters 134, and the workload profile 140. See operation 1 shown in FIG. 1. In the present description, the workload profile 140 refers to any data structure that is configured for specifying one or more aspects of a deployment of a workload generator. In various embodiments, such aspect(s) may refer to a location (e.g. a path for systems 110A, 110B, 110C) that should be the subject of workload generator deployment, a specific service provider, credentials, allocation of resources (e.g. processors, memory, etc.) to the workload generator(s) 116 being deployed, how much and what type of workload will be generated, and/or any other configurable aspect of the workload generator(s) deployment. In use, the workload generator(s) are configured to emulate activity (e.g. operations, data, etc.) for loading the deployed application(s) which, as will soon become apparent, is the basis for statistics generation that, in turn, may be used for application deployment assessment.

As mentioned earlier, the deployment specification composer 102 is also configured to receive the deployment parameters 134. In the context of the present description, such deployment parameters 134 may refer to any parameters that are configured to be used to control one or more aspects of the deployment of one or more applications. In various embodiments, such aspect(s) may refer to a location (e.g. which systems 110A, 110B, 110C and/or which specific geographical location) which should be the subject of application deployment, resource configuration (e.g. allocation of processors, memory, etc.) to the application(s) being deployed, scaling (e.g. how many instances of the application(s) should be deployed), and/or any other configurable aspect of the application(s) deployment. In one possible embodiment, the deployment parameters 134 may include a plurality of manually-generated parameters that are produced by a user and/or administrator.

Turning to the application specification file 132, such file may include any data structure that is configured for including the deployment parameters (including, but not limited to the deployment parameters 134). As an option, such application specification file 132 may include metadata (e.g. tags, labels, etc.) for identifying the deployment parameters, as well as possible code (e.g. scripts, etc.) for facilitating subsequent processing of the identified deployment parameters. As a further option, the application specification file 132 may include some default parameters (e.g. that are universally applicable), as well as some empty fields for being populated with the deployment parameters 134 that are tailored by a user/administrator. In one embodiment, the application specification file 132 may include a YAML™ file that natively encodes scalars (e.g. strings, integers, and floats), lists, and associative arrays (also known as hashes or dictionaries), where such data types are based on the PERL programming language. In another embodiment, the application specification file 132 may include a JavaScript Object Notation (JSON) file that is formatted to use human-readable text to transmit data objects consisting of attribute-value pairs.

Armed with such workload profile 140, deployment parameters 134, and application specification file 132, the deployment specification composer 102 is configured for generating and outputting the application deployment specification. See operation 2 in FIG. 1. In the context of the present description, such application deployment specification refers to any data structure that is configured for specifying one or more deployment aspects (including any of those mentioned above) of one or more applications and/or one or more workload generators. For example, in one possible embodiment, the application deployment specification may include a modified YAML™ or JSON file that may be generated by automatically integrating the workload profile 140 and the deployment parameters 134 into the application specification file 132, thereby affording an application deployment specification in the form of a modified application specification file 132. As will become apparent, the generation of such "all-in-one" application deployment specification permits a more automated (and thus more effective/efficient) application deployment and statistics generation, for assessment purposes.

Once the application deployment specification is generated by the deployment specification composer 102, it is passed to the API server 104 which communicates messages to the appropriate orchestrators 112A, 112B, 112C of the appropriate one or more of the systems 110A, 110B, 110C and further controls a scaling (e.g. a number of instances) of the deployed application(s) as well as an allocation of resources to the application(s) (all based on the application deployment specification). See operation 3 in FIG. 1. In use, the orchestrators 112A, 112B, 112C manage a cluster of hosts at the corresponding systems 110A, 110B, 10C. To accomplish this, each of the orchestrators 112A, 112B, 112C may include a container engine/manager that, for example, identifies an amount of resources at each host and then allocates resources of the hosts for application deployment by matching resources requirements (of the application(s)) with resource availability (of the host(s)).

Still yet, the API server 104 may deploy the workload generator(s) 116 to the appropriate one or more of the systems 110A, 110B, 10C and further controls a type and amount of workload activity that is generated by the workload generator(s) 116, so that the deployment of the application(s) may be assessed. As will be elaborated upon later, the API server 104 may even be adapted to transform the aforementioned messages to accommodate different types of orchestrators 112A, 112B, 112C.

To support such assessment, the monitoring agents 114A, 114B are configured to generate operational data in connection with the corresponding systems 110A, 110B, 10C. In the present description, such operational data may include any data that may be used to generate statistics (e.g. KPIs) for application deployment assessment. For example, in various embodiments, the operational data may include, but is not limited to latency, throughput, and/or error/failure rate in connection with operation of the deployed application(s) that is driven by the activity generated by the workload generator(s) 116.

In operation 4 of FIG. 1, the operational data of the monitoring agents 114A, 114B is collected by the KPI & score calculator 106. Further, the KPI & score calculator 106 is configured to aggregate, summarize, or otherwise process the operational data to generate one or more statistics (as dictated by the statistics selection 138) for assessing the deployment of the one or more applications. In the present description, such statistic(s) may include any quantum, quantity, variable, value, and/or any other data that includes, describes, or is derived from the operational data, and is useful in assessing the deployment of the application(s). As an option, the foregoing statistics may be processed to generate a score, in a manner that will be elaborated upon later. Further, as an additional option, one or more of such statistic(s) and/or the aforementioned score may be output to a user/administrator who, in turn, may use such output for generating a new application deployment specification (e.g. by tweaking the deployment parameters 134, etc.), so that the foregoing functionality may be iterated, the statistics/scores compared, and application deployment plans thereby improved before selection for actual deployment.

One or more of the foregoing features may thus afford a more automated application deployment assessment. This may be accomplished, for example, by pre-processing (e.g. integrating, etc.) the various input 130 by the deployment specification composer 102 before distribution via the API server 104, so that such various input 130 need not necessarily be separately and/or manually processed to configure various aspects of application/workload generator deployment. This may, in turn, result in additional efficiency and/or effectiveness in application deployment assessment (as well deployment itself) that would otherwise be foregone in systems that lack such capability. It should be noted that the aforementioned potential advantages are set forth for illustrative purposes only and should not be construed as limiting in any manner.

More illustrative information will now be set forth regarding various optional architectures and uses in which the foregoing method may or may not be implemented, per the desires of the user. It should be noted that the following information is set forth for illustrative purposes and should not be construed as limiting in any manner. Any of the following features may be optionally incorporated with or without the other features described.

Figure 2:
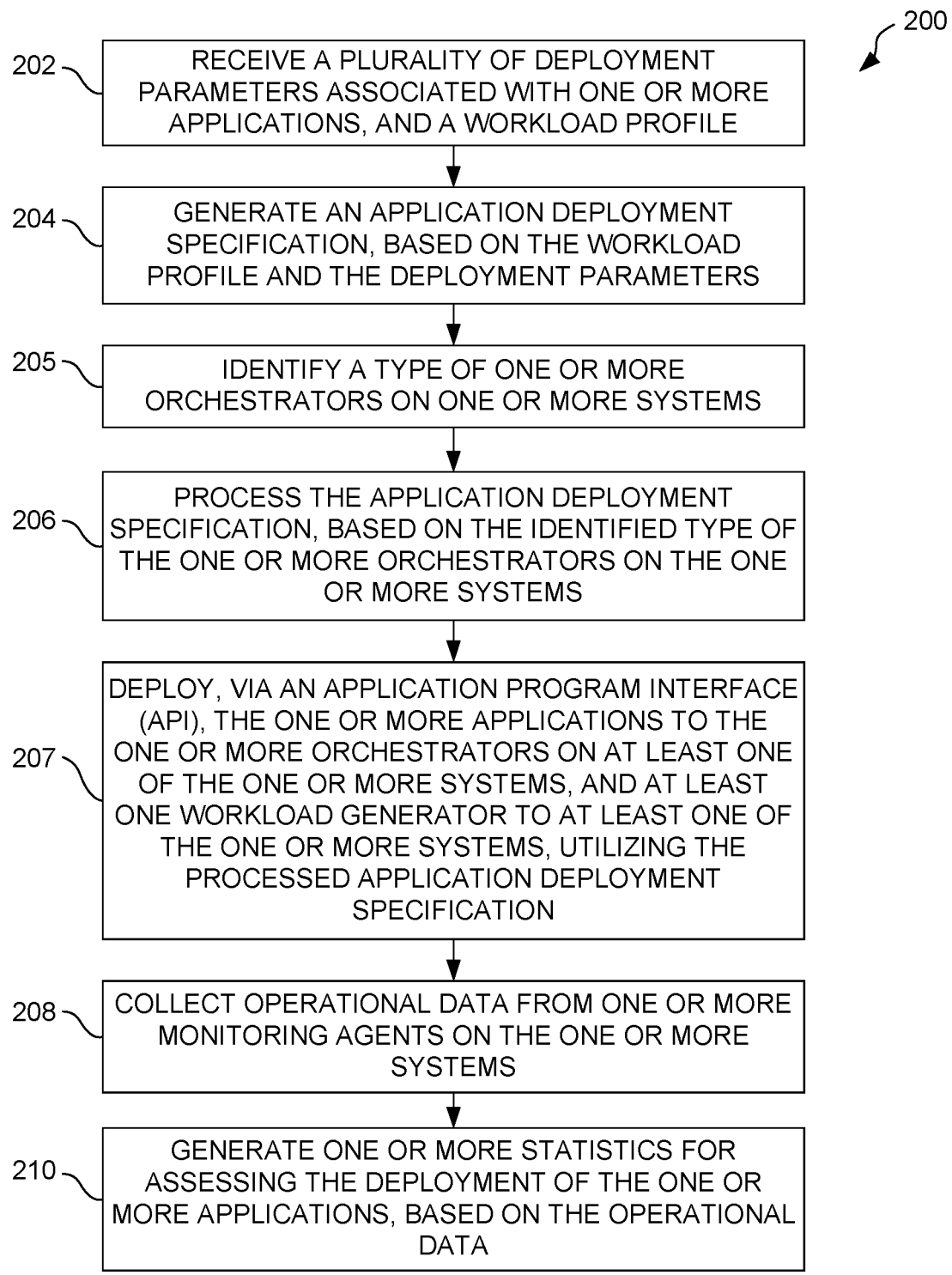
FIG. 2 illustrates a method for application deployment, in accordance with an embodiment.

FIG. 2 illustrates a method 200 for application deployment, in accordance with an embodiment. As an option, the method 200 may be implemented in the context of any one or more of the embodiments set forth in any previous and/or subsequent figure(s) and/or the description thereof. For example, in one possible embodiment, the method 200 may be implemented in the context of the apparatus 100 of FIG. 1. However, it is to be appreciated that the method 200 may be implemented in other suitable environments.

As shown, in operation 202, various input is received in the form of a plurality of deployment parameters (e.g. the deployment parameters 134 of FIG. 1), an application specification file associated with one or more applications (e.g. the application specification file 132 of FIG. 1), and a workload profile (e.g. the workload profile 140 of FIG. 1). In one embodiment, the input is received by an application deployment specification composer (e.g. the application deployment specification composer 102 of FIG. 1).

In operation 204, an application deployment specification is generated, based on the application specification file, the deployment parameters, and the workload profile. Strictly as an option, the application deployment specification may be validated in one embodiment, such that the application deployment specification is conditionally deployed based on the validation. More information regarding such optional embodiment will be set forth during the description of different embodiments illustrated in subsequent figures (e.g. FIG. 3).

With continuing reference to FIG. 2, a type of one or more orchestrators on one or more systems is identified, as set forth in operation 205. Further, the application deployment specification is processed in operation 206, based on the identified type of the one or more orchestrators on the one or more systems. To this end, the application deployment specification may be tailored to accommodate different orchestrators.

For example, in some embodiments, the one or more orchestrators on the one or more systems may include a first orchestrator of a first type (e.g. KUBERNETES, etc.) on a first system, and a second orchestrator of a second type (e.g. RANCHER, etc.) on a second system. In such embodiments, the application deployment specification may be configured for deploying the one or more applications to the first orchestrator and the second orchestrator differently to accommodate differences between the first orchestrator and the second orchestrator. More information regarding such optional embodiment will be set forth during the description of different embodiments illustrated in subsequent figures (e.g. FIG. 4).

As set forth in operation 207, the one or more applications are deployed, via an API, to the one or more orchestrators on at least one of the one or more systems. As further indicated, one or more workload generators is deployed to at least one of the one or more systems. As shown, the deployment of the application(s) and workload generator(s) is carried out, utilizing the application deployment specification that was processed in operation 206. In one possible embodiment, the operation 207 may be carried out by an API server (e.g. the API server 104 of FIG. 1).

Once the application(s) and workload generator(s) are deployed, the workload generator(s) generates activity that loads the application(s) so that the specific application deployment may be assessed. In such vein, in operation 208, operational data is collected from one or more monitoring agents on the one or more systems. To this end, one or more statistics are generated for assessing the deployment of the one or more applications, based on the operational data. See operation 210. In one possible embodiment, operation 210 may be carried out by a KPI & score calculator. (e.g. the KPI & score calculator 106 of FIG. 1).

As an option, the deployment of the one or more applications may also be validated, based on the one or more statistics. Further, the one or more statistics may be aggregated into a single score for assessing the deployment of the one or more applications. As an additional option, one or more of the operations of the method 200 may be iterated to improve application deployment. Specifically, while not shown, an additional application deployment specification may be generated (possibly by selecting new deployment parameters based on the one or more statistics), and then deployed for generating an additional one or more statistics/score for comparison purposes. More information regarding such optional embodiment will be set forth during the description of different embodiments illustrated in subsequent figures (e.g. FIG. 5).

Figure 3:
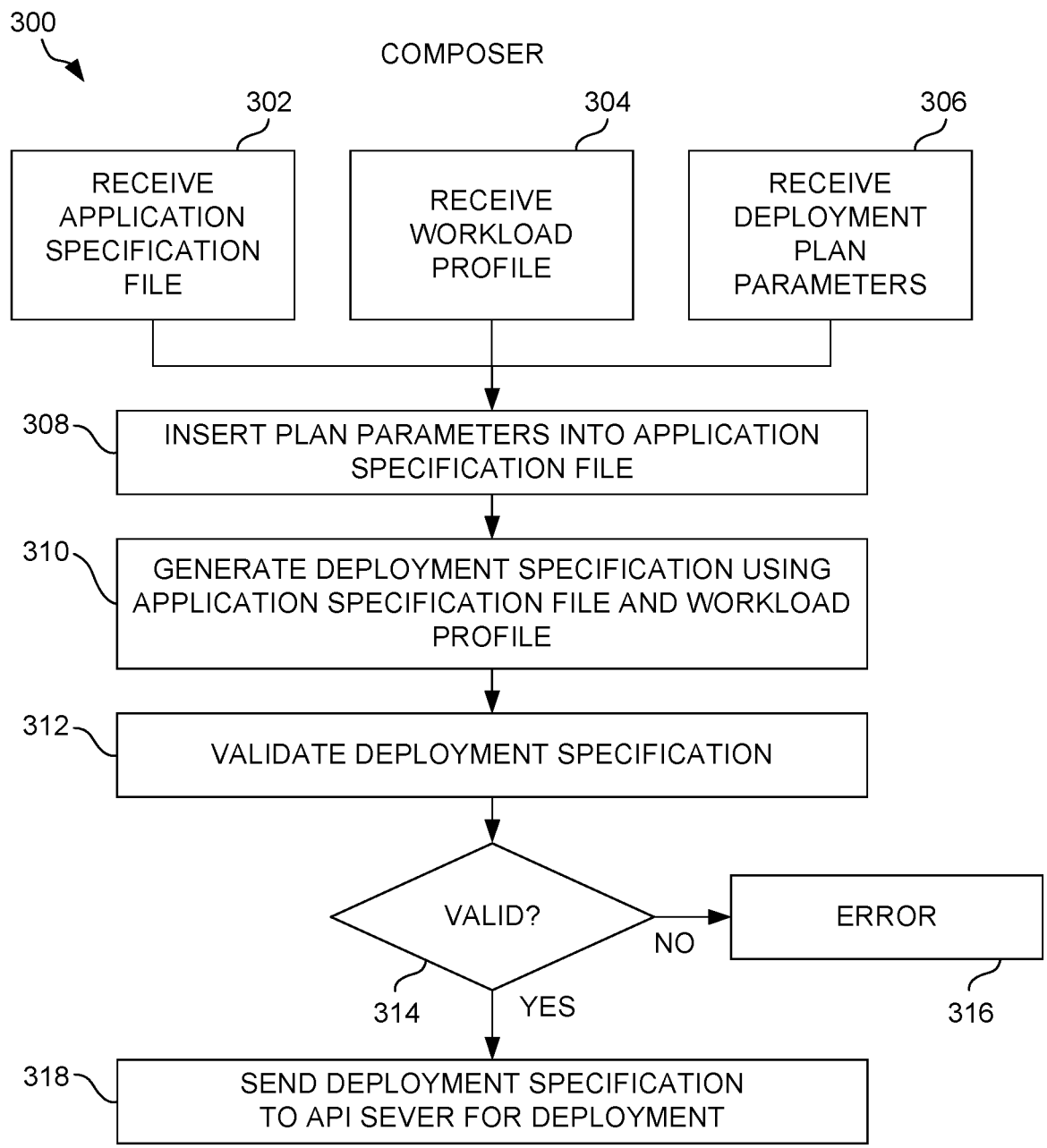
FIG. 3 illustrates a method for composing an application deployment specification, in accordance with an embodiment.

FIG. 3 illustrates a method 300 for composing an application deployment specification, in accordance with an embodiment. As an option, the method 300 may be implemented in the context of any one or more of the embodiments set forth in any previous and/or subsequent figure(s) and/or the description thereof. For example, in one embodiment, the method 300 may be implemented in the context of the deployment specification composer 102 of FIG. 1 and/or operations 202-204 of FIG. 2. However, it is to be appreciated that the method 300 may be implemented in other suitable environments.

As shown, various input is received including an application specification file in operation 302, a workload profile in operation 304, and deployment parameters in operation 306. As mentioned earlier, in one possible embodiment, the application specification file may include a YAML file. Further, the workload profile and deployment parameters may both include data that may be used to further supplement (and possibly replace) data in the YAML file.

For example, the deployment parameters may include data (generated by a user and/or administrator) that specifies a location where one or more applications are to be deployed, resource configuration (e.g. allocation of processors, memory, etc.) to the application(s) being deployed, scaling (e.g. how many instances of the application(s) should be deployed), and/or any other configurable aspect of the application(s) deployment. Further, the workload profile may include data (generated by a user and/or administrator) to specify a location that should be the subject of workload generator deployment, allocation of resources (e.g. processors, memory, etc.) to the workload generator(s) being deployed, how much and what type of workload will be generated by the workload generator(s), and/or any other configurable aspect of the workload generator(s) deployment. In one possible embodiment, the aforementioned data may be received in operations 304-306 in the form of manual data entry in connection with a graphical user interface. In another embodiment, such data may be received in operations 304-306 in the form of a formatted form (e.g. XML document, etc.) that may be processed to receive the same.

With continuing reference to FIG. 3, the deployment plan parameters received in operation 306 are inserted into the application specification file, as indicated in operation 308. In one embodiment, this may be accomplished by matching tags or other metadata received with (or attached to) the deployment plan parameters received in operation 306 with those of the application specification file. By this design, the underlying data (associated with such tags/metadata) may be used to populate (or replace) the relevant section(s) of the application specification file, thus affording an augmented application specification file.

Further, in operation 310, an application deployment specification is generated using the augmented application specification file (from operation 308), and the workload profile received in operation 304. In one embodiment, this may be accomplished by identifying a section of the augmented application specification file that governs workload generator deployment and operation. Once such section is identified, the relevant data from the workload profile may be used to populate (or replace) the relevant section(s) of the augmented application specification file, in order to create a single application deployment specification that reflects the contents of the workload profile. By this design, contents of the deployment plan parameters received in operation 306 and the workload profile received in operation 304 may be processed by subsequent automated operations as part of the application deployment specification, as opposed to requiring the separate and/or manual processing thereof.

As an option, in operation 312, the application deployment specification may be validated. In one embodiment, such validation may simply check a formatting of the application deployment specification, to ensure that no formatting errors and/or other informalities exist. In another embodiment, the validation of operation 312 may verify that all relevant sections (e.g. workload generator, deployment parameters, etc.) are populated. In still another embodiment, such validation may involve the application of business logic to check whether one or more rules or policies are violated or are conflicting. In any case, if such validation fails per decision 314, an error is returned in operation 316 with possibly an invitation to repeat operations 302, 304, and/or 306.

On the other hand, if the validation passes per decision 314, the deployment specification is sent to an API server (e.g. the API server 104 of FIG. 1). More information will now be set forth regarding one possible method that may be carried out in connection with the aforementioned API server.

Figure 4:
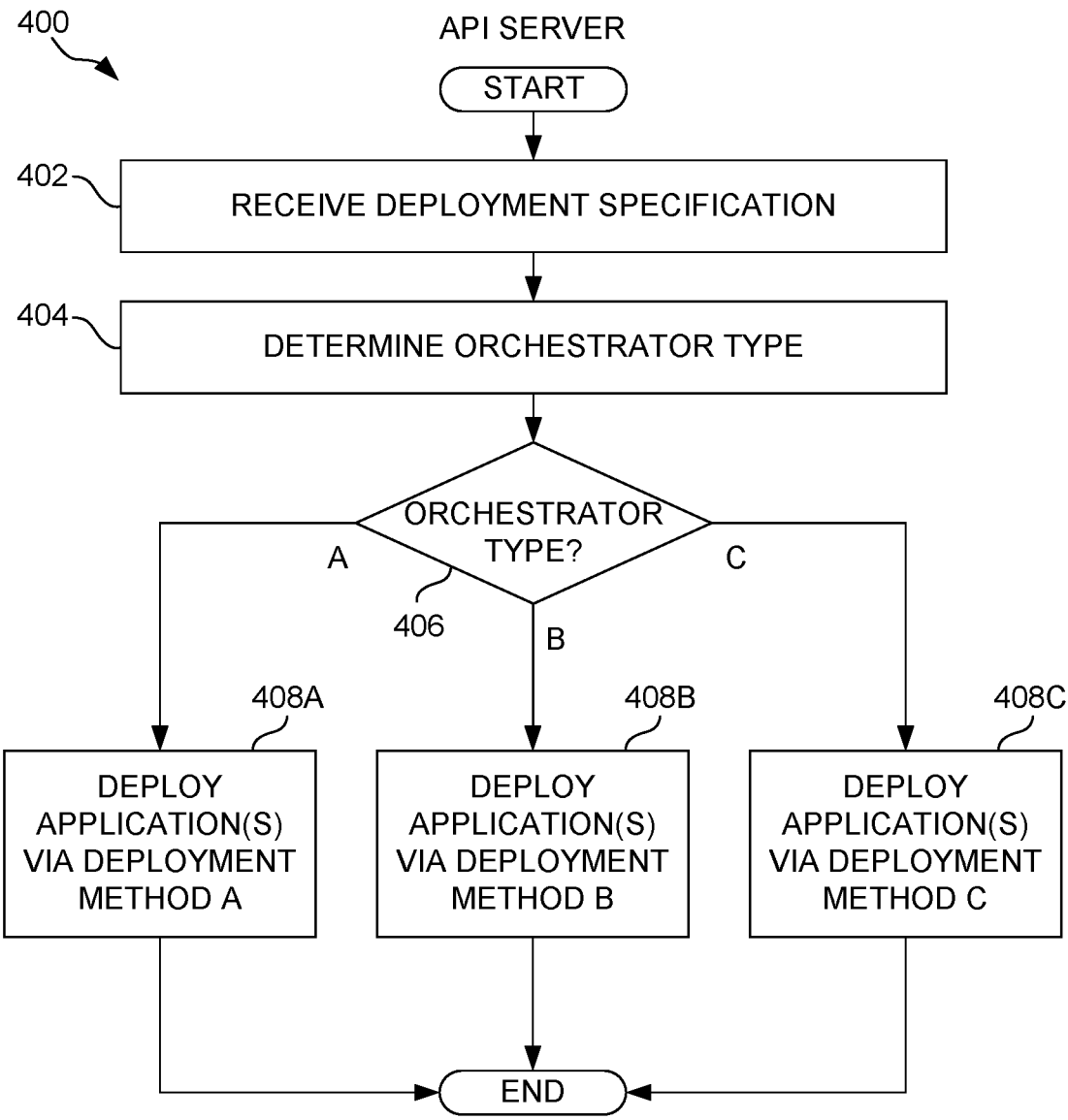
FIG. 4 illustrates a method for deploying one or more applications using an application deployment specification, in accordance with an embodiment.

FIG. 4 illustrates a method 400 for deploying one or more applications using an application deployment specification, in accordance with an embodiment. As an option, the method 400 may be implemented in the context of any one or more of the embodiments set forth in any previous and/or subsequent figure(s) and/or the description thereof. For example, in one embodiment, the method 400 may be implemented in the context of the API server 104 of FIG. 1 and/or operation 206 of FIG. 2. Still yet, the method 400 may be invoked in response to operation 318 of FIG. 3. However, it is to be appreciated that the method 400 may be implemented in other suitable environments.

As shown, an application deployment specification is received in operation 402. It is then determined as to what type of orchestrator one or more applications are to be deployed, using the application deployment specification. In one possible embodiment, the application deployment specification may explicitly indicate (e.g. in a predetermined field, etc.) the orchestrator type. In other embodiments, the orchestrator type may be queried directly from the orchestrator(s), or otherwise inferred.

To this end, a determination of the orchestrator type (see decision 406) drives the selection of different deployment methods for use in application deployment. See operations 408A, 408B, 408C. It should be noted that the deployment methods may vary in any way that accommodates differences among different orchestrators.

For example, in one embodiment, there may be different versions of the single application deployment specification that are specifically configured for use with different orchestrators. In such embodiment, a first application deployment specification version may only be deployed when accommodating a first orchestrator type (e.g. KUBERNETES, etc.), and a second application deployment specification version may only be deployed when accommodating a second orchestrator type (e.g. RANCHER, etc.). Further, to the extent that it is not known a priori what type of orchestrator will be the subject of deployment, different application deployment specification versions may be generated, so that any orchestrator type may be accommodated.

In another embodiment, a single orchestrator-agnostic application deployment specification may be employed. In one possible aspect of this embodiment, such single application deployment specification may simply be an amalgamation of multiple different application deployment specification versions (that were described above), such that only a relevant portion of the single application deployment specification may be used based on the orchestrator type. In still another aspect of the present embodiment, the application deployment specification may not necessarily be a straightforward amalgamation, but rather require different processing before being used to deploy to the relevant orchestrator type.

Just by of example, where a first orchestrator is of a KUBERNETES type, the application deployment specification (e.g. YAML file) may be decomposed into multiple specification components, and the method 400 may iterate through each of the specification components for deploying each component to the appropriate host. On the other hand, where a second orchestrator is of a RANCHER type, the application deployment specification (e.g. YAML file) may be decomposed into a DOCKER-compose file and a RANCHER-compose file, so that a RANCHER-compliant server may be called for deployment. To this end, the API server may automatically execute an in-cloud "dry run" by deploying an entire application stack in one step and via a single API (without necessarily relying on separate APIs), by decomposing and/or converting a single API call into one or more API calls suitable for the target orchestrator at the desired cloud location.

In any case, once the application(s) are deployed to the appropriate orchestrator at the relevant system(s) and the workload generator loads the deployed application(s), one or more monitoring agents begin to collect operational data that reflects various aspects (e.g. latency, throughput, error/failure rate, etc.) of application operation that results from a particular deployment scheme. This operational data is then made available to a KPI & score calculator (e.g. the KPI & score calculator 106 of FIG. 1) for statistics generation. More information will now be set forth regarding one possible method that may be carried out in connection with the aforementioned KPI & score calculator.

Figure 5:
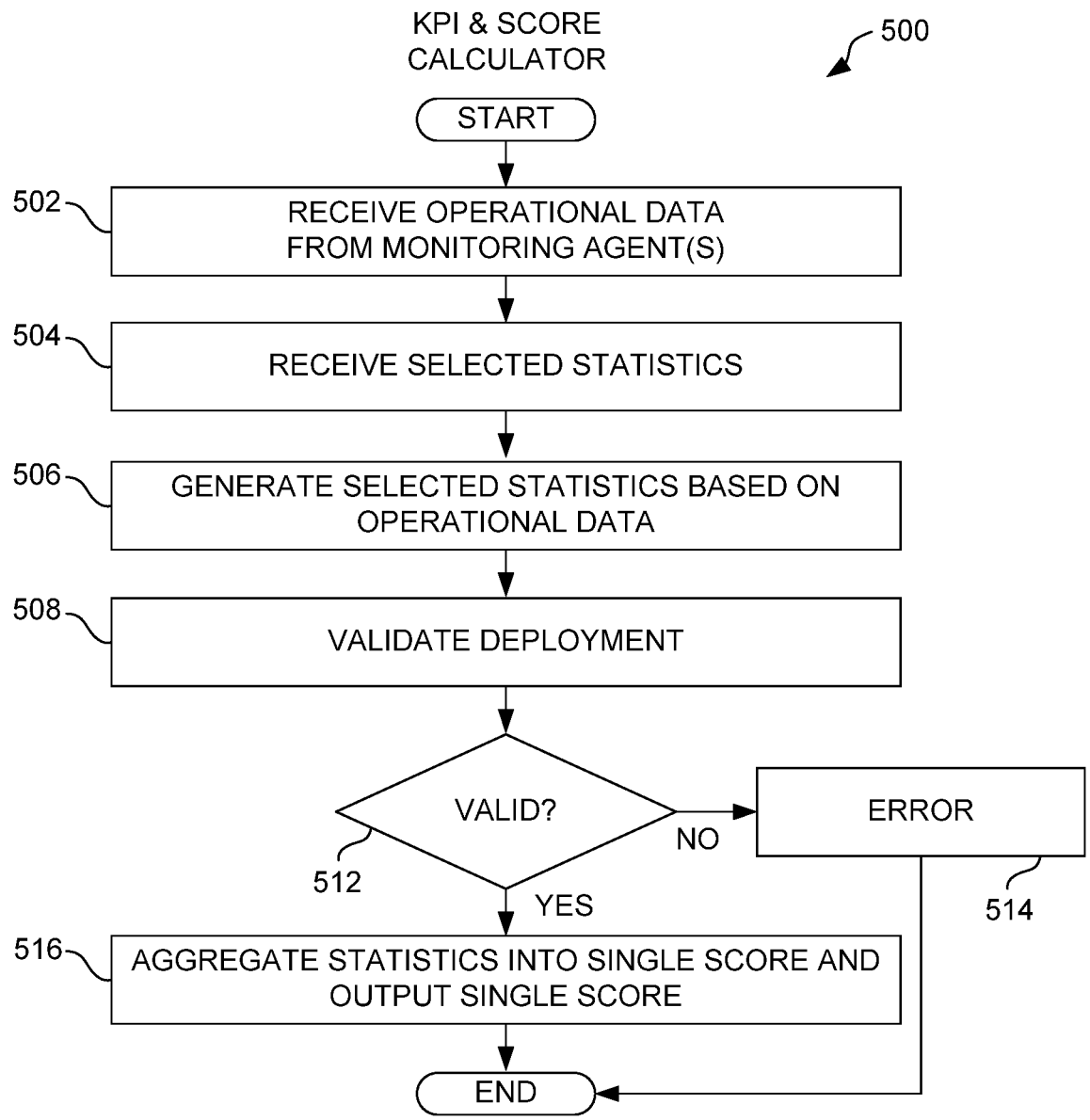
FIG. 5 illustrates a method for generating application deployment assessment statistics, in accordance with an embodiment.

FIG. 5 illustrates a method 500 for generating application deployment assessment statistics, in accordance with an embodiment. As an option, the method 500 may be implemented in the context of any one or more of the embodiments set forth in any previous and/or subsequent figure(s) and/or the description thereof. For example, in one embodiment, the method 500 may be implemented in the context of the KPI & score calculator 106 of FIG. 1 and/or operations 208-210 of FIG. 2. Still yet, the method 500 may be invoked in response to operations 408A-C of FIG. 4 and subsequent receipt of operational data. However, it is to be appreciated that the method 500 may be implemented in other suitable environments.

As shown, in operation 502, operational data is received from one or more monitoring agents. As mentioned earlier, such operational data reflects various aspects (e.g. latency, throughput, error/failure rate, etc.) of application operation that results from a particular deployment scheme. Further, the operational data may be received in any desired manner including, but not limited to receiving the same over a network via any push/pull mechanism, received via manual entry, etc.

Still yet, in operation 504, selected statistics are received from a user and/or administrator. To this end, such user and/or administrator may dictate how the operation data received in operation 502 is processed and used for statistics generation. For example, different administrators may have different priorities (e.g. cost, resource availability, and/or performance) and operation 504 allows for statistics generation that is relevant to such priorities.

Specifically, in operation 506, the statistics (selected per operation 504) are generated based on the operational data (received in operation 502). For example, to the extent that performance-related statistics are desired, the operational data that relates to performance (e.g. latency, throughput, error/failure rate, etc.) may be extracted and processed for generating relevant statistics. On the other hand, if resource availability-related statistics are desired, operational data that is relevant to a sufficiency of system resources (e.g. processor, memory, etc.) in meeting resource requirements of deployed applications may be used to generate the relevant statistics.

With continuing reference to FIG. 5, the overall deployment of the application(s) may be validated in operation 508. In one embodiment, this may be accomplished by comparing the aforementioned statistics to an overall threshold or any other metric. Again, such threshold may be statically and/or dynamically determined (by the user/administrator or developer). To this end, if it is determined per decision 512 that the application deployment has not been validated, an error is issued in operation 514.

On the other hand, if it is determined per decision 512 that the application deployment has indeed been validated, processing may continue as shown. Specifically, in order to further facilitate the review of such statistics, they may be aggregated into a single score in operation 516. In one embodiment, this may be accomplished by comparing the statistics against different thresholds to determine the relevant score. For example, in a three-score scoring system, a highest score may require a first statistical threshold, an intermediate score may require a second statistical threshold (lower than the first), and a lowest score may require a third statistical threshold (lower than the first and second). Further, the threshold may, in one embodiment, refer to a sum of all relevant statistics, and may be statically and/or dynamically determined (by the user/administrator or developer). To this end, multiple statistics may be aggregated into a single score, thereby facilitating application deployment assessment by a user and/or administrator. It should be noted that, in one optional embodiment, the score generated in operation 516 may be used in addition to or in lieu of the statistics, in connection with the aforementioned validation of operations 512-514.

As mentioned earlier, the above process may be iterative such that statistics/scores associated with different application deployment specifications may be compared to determine a best (or optimal) deployment scheme. By this design, the present method 500 may be used by an application operator to test multiple different deployment blueprints in multiple in-cloud dry runs (sequentially or in parallel) in a highly efficient and streamlined fashion, so that evaluation results from different application deployment specifications may be compared more easily. Further, an application operator may more quickly identify a deployment specification that provides a best tradeoff between multiple operational requirements (e.g. cost, availability, performance, etc.) that are deemed relevant to the operator. More information regarding a graphical user interface that may optionally be used to facilitate the foregoing decision-making process will be set forth during the description of different embodiments illustrated in subsequent figures (e.g. FIG. 6A).

Since the aforementioned application deployment "dry runs" deploy workload generators along with the target applications, and perform load testing directly in the cloud, a combination of the various features and components disclosed herein captures an uncertainty of cloud hosting conditions and provides more accurate evaluation results for different deployment options, allowing the application operator to make more informed decisions regarding the actual deployment. It may also allow a public infrastructure-as-a-service/platform-as-a-service provider or a multi-cloud portal service provider to offer advanced services to its customers for automated in-cloud dry runs before business critical applications move into production.

Figure 6A:
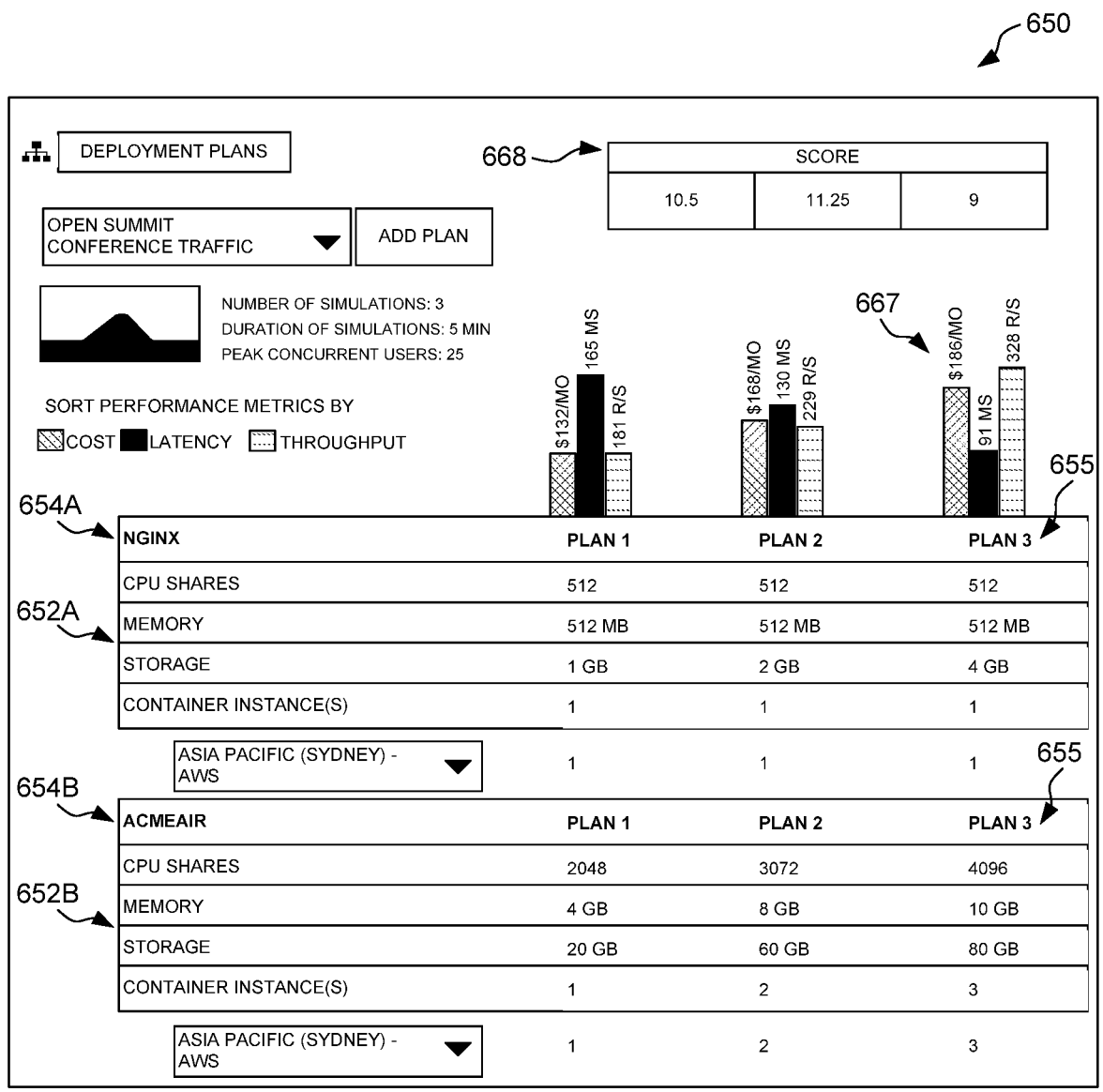
FIG. 6A illustrates a graphical user interface for assessing an application deployment, in accordance with an embodiment.

FIG. 6A illustrates a graphical user interface 650 for assessing an application deployment, in accordance with an embodiment. As an option, the graphical user interface 650 may be implemented in the context of any one or more of the embodiments set forth in any previous and/or subsequent figure(s) and/or the description thereof. However, it is to be appreciated that the graphical user interface 650 may be implemented in other suitable environments.

As shown, the graphical user interface 650 includes first operational data 652A and second operational data 652B associated with a first location 654A and a second location 654B, respectively, that were collected via a plurality of "dry runs" in connection with different application deployment plans 655. Also displayed are a plurality of statistics 667 that are generated for each of the different application deployment plans 655 and are collectively based on both the first operational data 652A and second operational data 652B. As shown, such statistics 667 include cost, latency, and throughput. Further displayed on the graphical user interface 650 are scores 668 that represent a simplified amalgamation of the statistics 667, in order to allow a more convenient assessment of the different application deployment plans 655. By this design, a user may not only more conveniently deploy applications for dry run assessments, but also select the one most suitable for the actual future deployments.

Figure 6B:
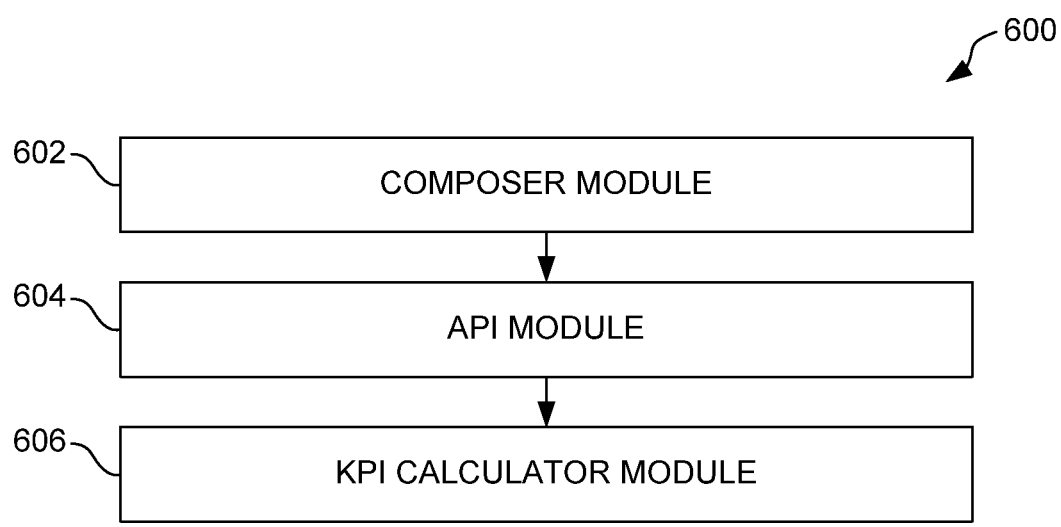
FIG. 6B illustrates a system for application deployment assessment, in accordance with an embodiment.

FIG. 6B illustrates a system 600 for application deployment assessment, in accordance with an embodiment. As an option, the system 600 may be implemented with one or more features of any one or more of the embodiments set forth in any previous and/or subsequent figure(s) and/or the description thereof. However, it is to be appreciated that the system 600 may be implemented in other suitable environments.

As shown, a composer means in the form of a composer module 602 is provided for receiving an application specification file, deployment parameters, and a workload profile; and generating an application deployment specification, based on the such received input (e.g. see operations 202-204 of FIG. 2). In various embodiments, the composer module 602 may include, but is not limited to the deployment specification composer 102 of FIG. 1, at least one processor (to be described later) and any software controlling the same, and/or any other circuitry capable of the aforementioned functionality.

Also included is an API means in the form of an API module 604 in communication with the composer module 602 for deploying: the one or more applications to one or more orchestrators on one or more systems, and one or more workload generators to at least one of the one or more systems, utilizing the application deployment specification (e.g. see operation 206 of FIG. 2). In various embodiments, the API module 604 may include, but is not limited to the API server 104 of FIG. 1, at least one processor (to be described later) and any software controlling the same, and/or any other circuitry capable of the aforementioned functionality.

With continuing reference to FIG. 6B, KPI/score calculation means in the form of a KPI/score calculation module 606 is in communication with the API module 604 via various systems (e.g. systems 110A-C of FIG. 1), for collecting operational data from one or more monitoring agents on the one or more systems, and generating one or more statistics for assessing the deployment of the one or more applications, based on the operational data (e.g. see operations 208-210 of FIG. 2). In various embodiments, the KPI/score calculation module 606 may include, but is not limited to the KPI & score calculator 106 of FIG. 1, at least one processor (to be described later) and any software controlling the same, and/or any other circuitry capable of the aforementioned functionality.

More information will now be set forth regarding one possible example of various input/output of the different components described hereinabove. Specifically, FIG. 6C illustrates an application specification file 660, in accordance with an embodiment. As an option, the application specification file 660 may be implemented with one or more features of any one or more of the embodiments set forth in any previous and/or subsequent figure(s) and/or the description thereof. For example, in one possible embodiment, the application specification file 660 may take the form of the application specification file 132 of FIG. 1, the application specification file received in operation 302 of FIG. 3, etc. However, it is to be appreciated that the application specification file 660 may be implemented in other suitable environments.

Lines 0001-007 of the application specification file 660 include a key for use in accessing a user image repository. Lines 0009-024 of the application specification file 660 call a user's internal service for a user database. In one embodiment, it may include a route table and does not necessarily use any computing resource. Lines 0030-031 of the application specification file 660 include labels of a replication controller that controls replication of any deployed applications. Lines 0034-039 of the application specification file 660 do not necessarily specify resources that MYSQL would otherwise use, so as to protect a cloud provider from a situation where MYSQL may grab resources that would be used by other components.

FIG. 6D illustrates a workload profile 670, in accordance with an embodiment. As an option, the workload profile 670 may be implemented with one or more features of any one or more of the embodiments set forth in any previous and/or subsequent figure(s) and/or the description thereof. For example, in one possible embodiment, the workload profile 670 may take the form of the workload profile 140 of FIG. 1, the workload profile received in operation 304 of FIG. 3, etc. However, it is to be appreciated that the workload profile 670 may be implemented in other suitable environments.

As shown, Lines 0016-0017 of the workload profile 670 enables a node selector to determine which machine (e.g. location, service provider, etc.) the load generator is to be deployed and run. Line 0021 of the workload profile 670 indicates how much and what type of workload may be generated (as defined by a user via an image associated with the user).

FIG. 6E illustrates deployment parameters 680, in accordance with an embodiment. As an option, the deployment parameters 680 may be implemented with one or more features of any one or more of the embodiments set forth in any previous and/or subsequent figure(s) and/or the description thereof. For example, in one possible embodiment, the deployment parameters 680 may take the form of the deployment parameters 134 of FIG. 1, the deployment parameters received in operation 306 of FIG. 3, etc. However, it is to be appreciated that the deployment parameters 680 may be implemented in other suitable environments.

As shown, Line 0005 of the deployment parameters 680 indicates how many instances of the application(s) should be deployed. Similarly, Lines 0018 and 0031 of the deployment parameters 680 also represent a number of instances. Lines 0009-0010 of the deployment parameters 680 allocate processors and memory for application deployment. Lines 0022-0023 and 0035-0036 of the deployment parameters 680 also address allocation of processors and memory.

FIG. 6F illustrates a deployment specification 690, in accordance with an embodiment. As an option, the deployment specification 690 may be implemented with one or more features of any one or more of the embodiments set forth in any previous and/or subsequent figure(s) and/or the description thereof. For example, in one possible embodiment, the deployment specification 690 may take the form of the application deployment specification generated by the deployment specification composer 102 of FIG. 1, the application deployment specification generated in operation 310 of FIG. 3, etc. However, it is to be appreciated that the deployment specification 690 may be implemented in other suitable environments.

As shown, Lines 001-007 of the deployment specification 690 identify a user key for access purposes. Further, Lines 009-024 and 077-088 of the deployment specification 690 identifies a user's internal service. Lines 026-052 of the deployment specification 690 identifies the user's database, so that capacity planning may determine resource allocation and a number of instances thereof. Even still, Lines 054-075 of the deployment specification 690 identify a user's database injection toolkit. Lines 090-113 of the deployment specification 690 identify a user's webpage server, so that capacity planning may determine resource allocation and a number of instances thereof. Lines 115-128 of the deployment specification 690 identify a user's service (as it is publicly exposed), so that a KPI sensor may be attached thereto. Still yet, Lines 130-154 of the deployment specification 690 identify a user's load balancer, so that capacity planning may determine resource allocation and a number of instances thereof. During capacity planning, the resource limits may be input to protect other running containers (e.g. resources: limits: cpu: 1000 m, memory: 1024 Mi).

Figure 6G:
FIG. 6G illustrates a modified deployment specification for the purpose of accommodating a particular type of orchestrator, namely a DOCKER-composer-type orchestrator.

As mentioned earlier in the context of operations 402-408A, B, C of FIG. 4, the deployment specification 690 of FIG. 6F may be tailored for different types of orchestrators. Specifically, FIG. 6G illustrates a modified deployment specification 690-1 for the purpose of accommodating a particular type of orchestrator, namely a DOCKER-composer-type orchestrator. As an option, the modified deployment specification 690-1 may be implemented with one or more features of any one or more of the embodiments set forth in any previous and/or subsequent figure(s) and/or the description thereof. For example, in one possible embodiment, the modified deployment specification 690-1 may take the form of the application deployment specification modified by the API server 104 of FIG. 1, the application deployment specification modified in operations 408A, 408B, and/or 408C of FIG. 4, etc. However, it is to be appreciated that the modified deployment specification 690-1 may be implemented in other suitable environments.

Further, FIG. 6H illustrates a modified deployment specification 690-2 for the purpose of accommodating a particular type of orchestrator, namely a RANCHER-composer-type orchestrator. As an option, the modified deployment specification 690-2 may be implemented with one or more features of any one or more of the embodiments set forth in any previous and/or subsequent figure(s) and/or the description thereof. For example, in one possible embodiment, the modified deployment specification 690-2 may take the form of the application deployment specification modified by the API server 104 of FIG. 1, the application deployment specification modified in operations 408A, 408B, and/or 408C of FIG. 4, etc. However, it is to be appreciated that the modified deployment specification 690-2 may be implemented in other suitable environments.

Figure 7:
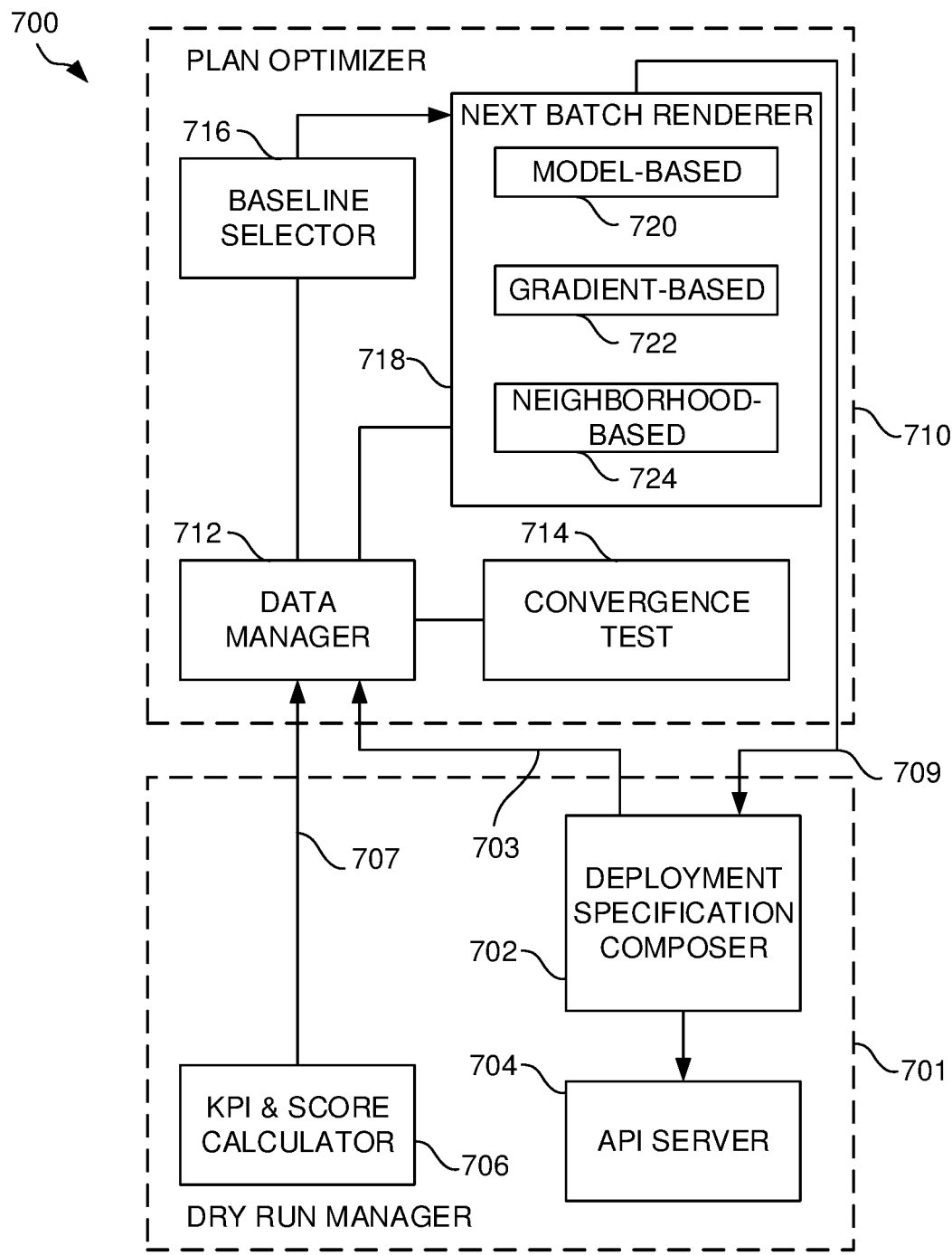
FIG. 7 illustrates a plan optimizer-equipped system with a dry run manager for application deployment assessment, in accordance with another embodiment.

FIG. 7 illustrates a plan optimizer-equipped system 700 for application deployment assessment, in accordance with another embodiment. As an option, the system 700 may be implemented with one or more features of any one or more of the embodiments set forth in any previous and/or subsequent figure(s) and/or the description thereof. However, it is to be appreciated that the system 700 may be implemented in other suitable environments.

As shown, a dry run manager 701 is provided including an application deployment specification composer 702 (e.g. application deployment specification composer 102 of FIG. 1), an API server 704 (e.g. API server 104 of FIG. 1), and a KPI & score calculator 706 (e.g. KPI & score calculator 106 of FIG. 1). Similar to previous embodiments, the dry run manager 701 is configured for generating an application deployment specification utilizing the application deployment specification composer 702, based on operational requirements (e.g. workload profile, etc.), an application specification file, and deployment parameters (not shown).

As described in previous embodiments, based on such application deployment specification, the dry run manager 701 is configured for deploying an application and workload generator utilizing the API server 704 and receiving/processing statistics via the KPI & score calculator 706. In contrast (or as a supplement) to such previous embodiments, such dry run manager-generated application deployment specification may be fed to a plan optimizer 710 as a baseline specification for the purpose of generating additional batches of application deployment specifications (using a variety of models) which, in turn, may be iteratively tested via the dry run manager 701, in order to automatically identify an optimized subset of application deployment specifications for being recommended to a user.

To accomplish this, such plan optimizer 710 is equipped with a data manager 712 (e.g. an internal cache, database, memory, etc.) in communication with the composer 702 via path 703. The data manager 712 is further in communication with the KPI & score calculator 706 via path 707, as well as a baseline selector 716 and a convergence test module 714 in communication with the data manager 712. Still yet, the system 700 further includes a next batch render 718 that, in turn, includes a model-based module 720, a gradient-based module 722, and a neighbor-based module 724. As shown, the next batch render 718 is in communication with the baseline selector 716. Further, the next batch render 718 is also in communication with the composer 702 of the dry run manager 701 via path 709.

In operation, the data manager 712 serves to store a plurality of models such as a classification model and/or a regression model. In the present description, such classification model may include any model with dependent variables that are categorical and unordered for use in classifying data into a class, while the regression model may have dependent variables that are continuous values or ordered whole values for use in predicting an output value using training data. Other models may also be stored including gradient-based models, or neighborhood models that are built using nearest neighbor algorithms.

In addition to storing such models, the data manager 712 serves to update the models based incoming statistics or related values (e.g. scores, etc.). Further, for reasons that will soon become apparent, the data manager 712 has access to the convergence test module 714 for determining a similarity of different application deployment specifications based on corresponding statistics or related values (e.g. scores, etc.).

Still yet, the baseline selector 716 includes a facility for selecting one of a plurality of different application deployment specifications as a baseline application deployment specification. The selection of such baseline specification may be based on any desired criteria including, but not limited to a specification with a highest score, a specification that best meets service level agreement criteria, etc.

Moving now to the next batch render 718, such component may be used to generate additional (e.g. a next batch of) application deployment specifications, based on a baseline application deployment specification (selected by the baseline selector 716), using one or more of the models stored by the data manager 712. To accomplish this, the next batch renderer 718 may use various criteria to select one or more of: the model-based module 720, gradient-based module 722, and/or neighbor-based module 724, for generating the additional application deployment specifications which, once generated and forwarded to the application deployment specification composer 702, the application deployment specification composer 702 injects (into the specifications) an allocation of resources that will be used to determine how much and what type of resources are used to deploy the application.

To this end, a user need not necessarily manually interpret an output of the KPI & score calculator 706 for the purpose of tweaking new application deployment specifications in an iterative process that is primarily driven by user input based on statistics/scores. Instead, a baseline application deployment specification may be either manually or automatically selected, after which a batch of possible application deployment specification candidates are generated therefrom using the plan optimizer 710, based on one or more different models (that are updated based on statistics/scores received from the KPI & score calculator 706). Such batch of possible application deployment specification candidates (or a subset that represent the best thereof) may then be deployed via the data manager 712 to generate statistics/scores which, in turn, may be used to not only update the models, but may also be used to generate another batch of possible application deployment specification candidates.

This may thus be repeated until the convergence test module 714 indicates that the resultant statistics/scores results of a current batch of deployment specifications are sufficiently similar to a previous batch. At that point, the latest possible application deployment specification candidates (or a subset that represent the best thereof) may be presented to a user as recommended specifications. Armed with such recommended specifications, the user may, in some possible embodiments, be able to deploy an application/workload generator using the dry run manager 701 to confirm that such specification candidates do indeed meet SLA requirements.

Figure 8:
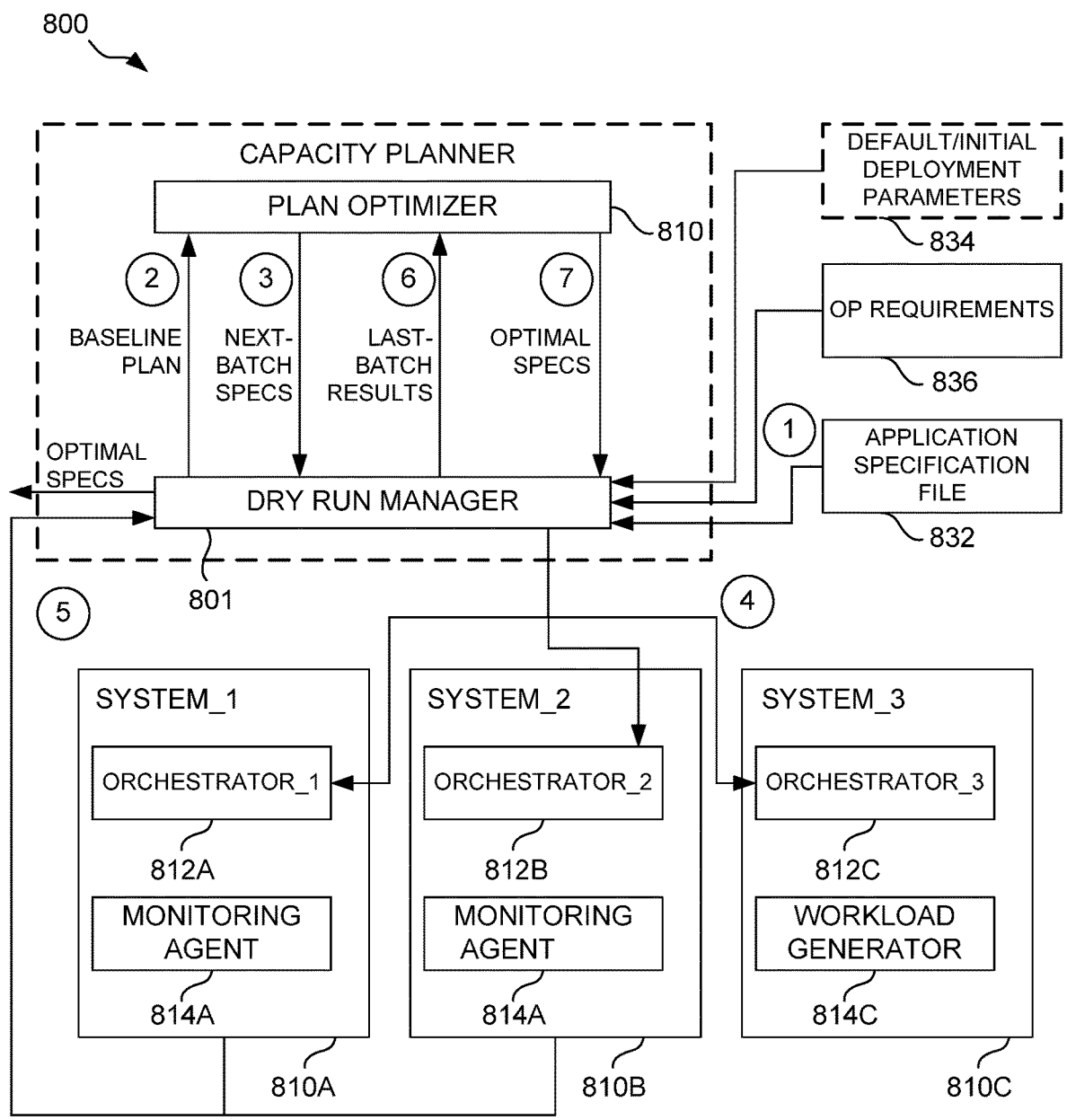
FIG. 8 illustrates a plan optimizer-equipped system with a dry run manager during use, in accordance with another embodiment.

More information will now be set forth regarding a possible use of the plan optimizer-equipped system 700 during the description of a possible embodiment illustrated in FIG. 8. Thereafter, a potential flow of operation of the plan optimizer-equipped system 700 will be set forth during the description of a possible embodiment illustrated in FIG. 9. Then, during the description of possible embodiments illustrated in FIGS. 10-12, the operation of the model-based module 720, gradient-based module 722, and neighbor-based module 724 of the next batch render 718 will be described.

FIG. 8 illustrates a plan optimizer-equipped system 800 during use, in accordance with another embodiment. As an option, the system 800 may be implemented with one or more features of any one or more of the embodiments set forth in any previous and/or subsequent figure(s) and/or the description thereof. For example, in one possible embodiment, the system 800 may reflect possible operation of the system 700 of FIG. 7. However, it is to be appreciated that the system 800 may be implemented in other suitable environments.

As shown, the system 800 includes a plan optimizer 810 (e.g. the plan optimizer 710 of FIG. 7) in communication with a dry run manager 801 (e.g. the dry run manager 701 of FIG. 7). The dry run manger 801, in turn, is in communication with a plurality of systems 810A, 810B, 810C including orchestrators 812A, 812B, 812C. Further, one or more of the systems 810A, 810B, 810C is equipped with monitoring agents 814A, 814B, and/or a workload generator 816.

As mentioned earlier, the dry run manger 801 is configured for generating and/or deploying application deployment specifications utilizing, based on operational requirements (e.g. workload profile, etc.) 834, an application specification file 832, and deployment parameters 836. Further, based on the application deployment specification(s), the dry run manager 801 is configured for deploying an application/workload generator utilizing an API server (e.g. the API server 704 of FIG. 7) and receiving/processing statistics via a KPI & score calculator (e.g. the KPI & score calculator 706 of FIG. 7).

In order to identify an optimized subset of application deployment specifications for eventual use in application/workload deployment, the plan optimizer 810 starts by receiving a first (baseline) application deployment specification that is generated by the dry run manger 801. See operations 1-2. In FIG. 8, such baseline application deployment specification is shown to be generated by the dry run manger 801, based on the operational requirements (e.g. workload profile, etc.) 834, the application specification file 832, and the deployment parameters 836. It should be noted, however, that, in other embodiments, the dry run manger 801 may receive only some of the inputs 832, 834, and 836 from a user, in order to generate the baseline specification, while the remaining inputs may be automatically provided by the plan optimizer 810. In still other embodiments, the plan optimizer 810 may simply generate the baseline specification (from scratch or by selection) without receiving one or more (or all) of such inputs 832, 834, and 836 from the user.

In any case, the plan optimizer 810 generates a plurality of the application deployment specifications, based on the baseline application deployment specification. Further, a subset of the plurality of the application deployment specifications may be selected by the plan optimizer 810. For example, a dry run deployment may be simulated using the generated application deployment specifications and one or more models, for determining whether certain criteria (e.g. SLA requirements) are met and, if so, to what extent they are met.

To this end, the subset of the plurality of the application deployment specifications that best meet such criteria may be selected for being sent, in operation 3, to the dry run manger 801 for deployment in operation 4. Such deployment results in the generation of a first set of one or more statistics in connection therewith which are collected by the dry run manger 801 in operation 5 and subsequently fed to the plan optimizer 810. See operation 6.

Based on such statistics, the plan optimizer 810 generates additional deployment specifications. It should be noted that the plan optimizer 810 may generate the additional deployment specifications in any manner that is based on such statistics. For example, in one embodiment, information (e.g. a score, etc.) may be derived from the statistics, for use in generating the additional deployment specifications. In other embodiments, the statistics may be more directly used. In any case, models that are used by the plan optimizer 810 to generate deployment specifications are updated based on the statistics (either directly or indirectly), and such updated models are then, in turn, used to generate the additional deployment specifications. Thus, the one or more models may be trained, utilizing at least a portion of the one or more statistics.

To this end, a subset of the additional deployment specifications may be selected, such that the subset of the additional deployment specifications may be deployed (see, again, operation 3), for generating a second set of one or more statistics, etc. By this design, operations 3-6 are iterated until a convergence test is passed. In other words, such iteration continues until the additional deployment specifications do not produce results (e.g. statistics) that surpass previous deployments by a predetermined margin.

In one embodiment, the aforementioned convergence test may involve a comparison of the first set of statistics and the second set of statistics in order to determine a similarity therebetween is within a predetermined threshold (which may or may not be configurable). In the event that it is determined that the foregoing similarity is within the predetermined threshold, the aforementioned iteration of operations 3-6 may be ceased, and a deployment specification recommendation may be made to a user, per operation 7.

Table 6 is a detailed summary of the interactions of the plan optimizer 810 and the dry run manager 801 (e.g. see operations 1-7 of FIG. 8).

Table 1

Operation 1—
The dry run manger 801 generates a first (baseline) application deployment specification via a deployment specification composer (e.g. the composer 702 of FIG. 7) that generates the same via an associated method (e.g. the method 300 of FIG. 3).
Operation 2—
The plan optimizer 810 receives (e.g. via the path 703 of FIG. 7) the first (baseline) application deployment specification that is generated by the dry run manger 801.
Operation 3—
The plan optimizer 810 generates a next batch of application deployment specifications using a next batch renderer (e.g. the next batch renderer 718 of FIG. 7) via an associated method (e.g. the methods 900-1200 to be described in connection with FIGS. 9-12).
Operation 4—
The dry run manger 801 deploys (e.g. via the path 709 of FIG. 7) one or more specifications of the next batch of application deployment specifications via an associated method (e.g. the method 400 of FIG. 4).
Operation 5—
The dry run manger 801 collects deployment results and generates statistics via an associated method (e.g. the method 500 of FIG. 5).
Operation 6—
The dry run manger 801 sends (e.g. via the path 707 of FIG. 7) the generated statistics to the plan optimizer 810, for being used to generate additional application deployment specifications using a next batch renderer (e.g. the next batch renderer 718 of FIG. 7) via an associated method (e.g. the methods 900-1200 to be described in connection with FIGS. 9-12).
Operation 7—
After one or more iterations of the operations 3-6 and after a convergence test (e.g. see convergence test 714 of FIG. 7) has been satisfied, a deployment specification recommendation is made to the user, in the form of a recommended deployment specification.

Figure 9:
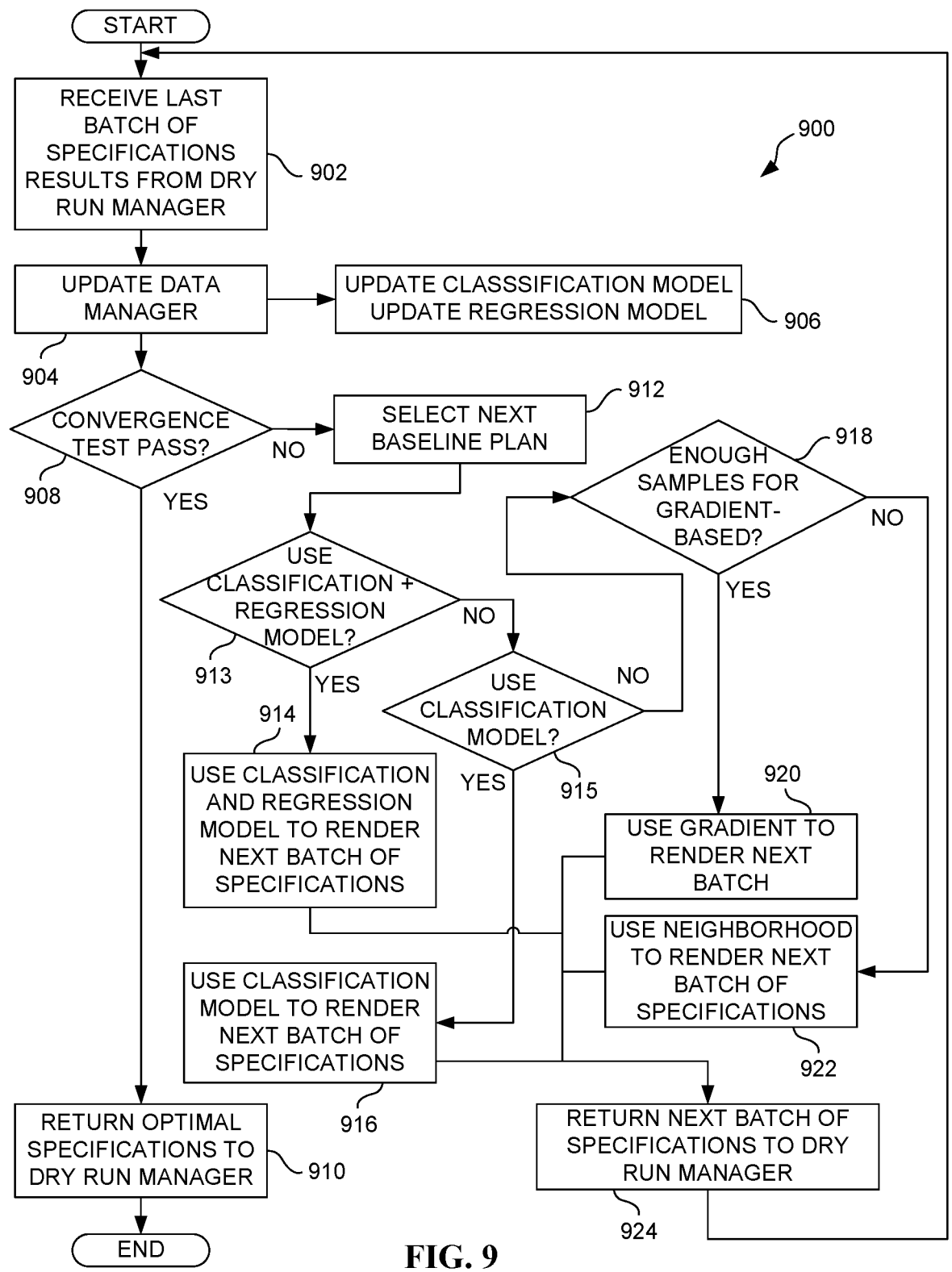
FIG. 9 illustrates a plan optimizer method during use, in accordance with another embodiment.

More information will now be set forth regarding the operation of the plan optimizer 810 in connection with processing of batch results (see operation 6) and identifying a next batch of additional deployment specifications, in accordance with a possible embodiment illustrated in FIG. 9.

FIG. 9 illustrates a plan optimizer method 900 during use, in accordance with another embodiment. As an option, the method 900 may be implemented with one or more features of any one or more of the embodiments set forth in any previous and/or subsequent figure(s) and/or the description thereof. For example, in one possible embodiment, the method 900 may reflect possible operation of the plan optimizer 810 of FIG. 8. However, it is to be appreciated that the method 900 may be implemented in other suitable environments.

As shown, results (e.g. statistics, scores, etc.) associated with a dry run deployment of a previous batch of application deployment specifications is received in operation 902. In one embodiment, such results may be received at a plan optimizer (e.g. the plan optimizer 810 of FIG. 8) from a dry run manager (e.g. the dry run manager 801 of FIG. 8). In response to the receipt of such results, a data manager (e.g. the data manager 712 of FIG. 2) is updated (e.g. the results are thereby stored), in operation 904.

Further, in operation 906, one or more related models (e.g. classification/regression models, etc.) are updated. For instance, in the context of a simplistic example where a model is represented by the equation $y=ax_1+bx_2$, results may be used to update the coefficients a, b of such model. To this end, the models (which are used to generate a next batch application deployment specifications) may be constantly updated and thus more accurately reflect the deployment environment.

With continuing reference to FIG. 9, it is determined whether a convergence test has passed in decision 908. As mentioned earlier, such convergence test may involve a determination whether a similarity among dry run results of two different batches of application deployment specifications is within a predetermined threshold. While not shown, the decision 908 may substituted or supplemented with a determination as to whether a certain or maximum number of iterations (of operations 3-6 of FIG. 8) has occurred.

If the decision 908 has passed, it is no longer necessary or worthwhile to continue generating and testing new application deployment specifications, and optimal candidate deployment specification plans are output to the dry run manager for presentation to a user. See operation 910. It should be noted that such recommendation may include any formerly-tested application deployment specifications (and not necessarily the latest-tested specifications).

On the other hand, if it is determined the convergence test has not passed in operation 908 (and thus more testing is warranted), a next baseline specification is selected by a baseline selector (e.g. the baseline selector 716 of FIG. 7). See operation 912. In one embodiment, such next baseline specification may be any one of the deployment specifications that were generated as a result of a previous iteration of the method 900 of FIG. 9 (based on a previous version of the models). For example, in one embodiment, statistics/scores associated with the previously-generated deployment specifications may be used to select a highest-scoring deployment specification as the next baseline specification.

It is then determined which model is to be used to generate (e.g. render) the next batch of application deployment specifications. Further, this is accomplished via a tiered-approach that selects a particular model by checking relevant criteria for each type of available model, in a predetermined order. To accomplish this, it is first determined in decision 913 whether a combination of a classification model and a regression model should be used and, if so, such combination is used in operation 914 (an example of which will be set forth during the description of an embodiment shown in FIG. 10). If the combination model is not to be used, it is then determined in decision 915 whether just a classification model should be used and, if so, such classification model is used in operation 916 (an example of which will be set forth during the description of an embodiment shown in FIG. 11).

Figure 12:
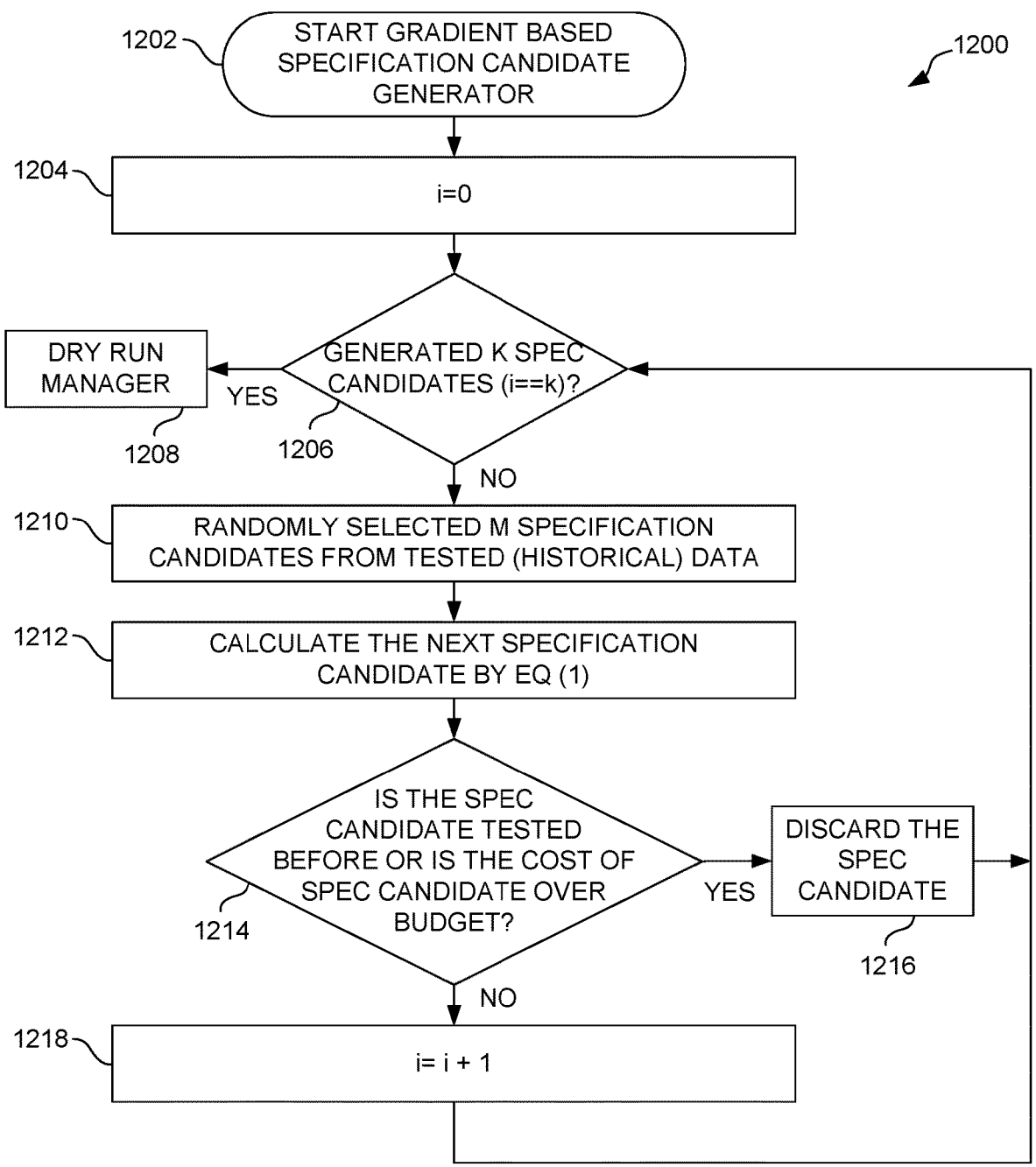
FIG. 12 illustrates a gradient-based model method for generating additional application deployment plans, in accordance with another embodiment.

If both decisions 913 and 915 fail, it is then determined in decision 918 whether there is a sufficient number of samples for using a gradient-based model and, if so, such gradient-based model is used in operation 920 (an example of which will be set forth during the description of an embodiment shown in FIG. 12). If the gradient-based model is not to be used, a neighborhood-based model is used per decision 922. In any case, the next rendered batch of the application deployment specifications is deployed to the dry run manager in operation 924 for an additional iteration of testing.

Figure 10:
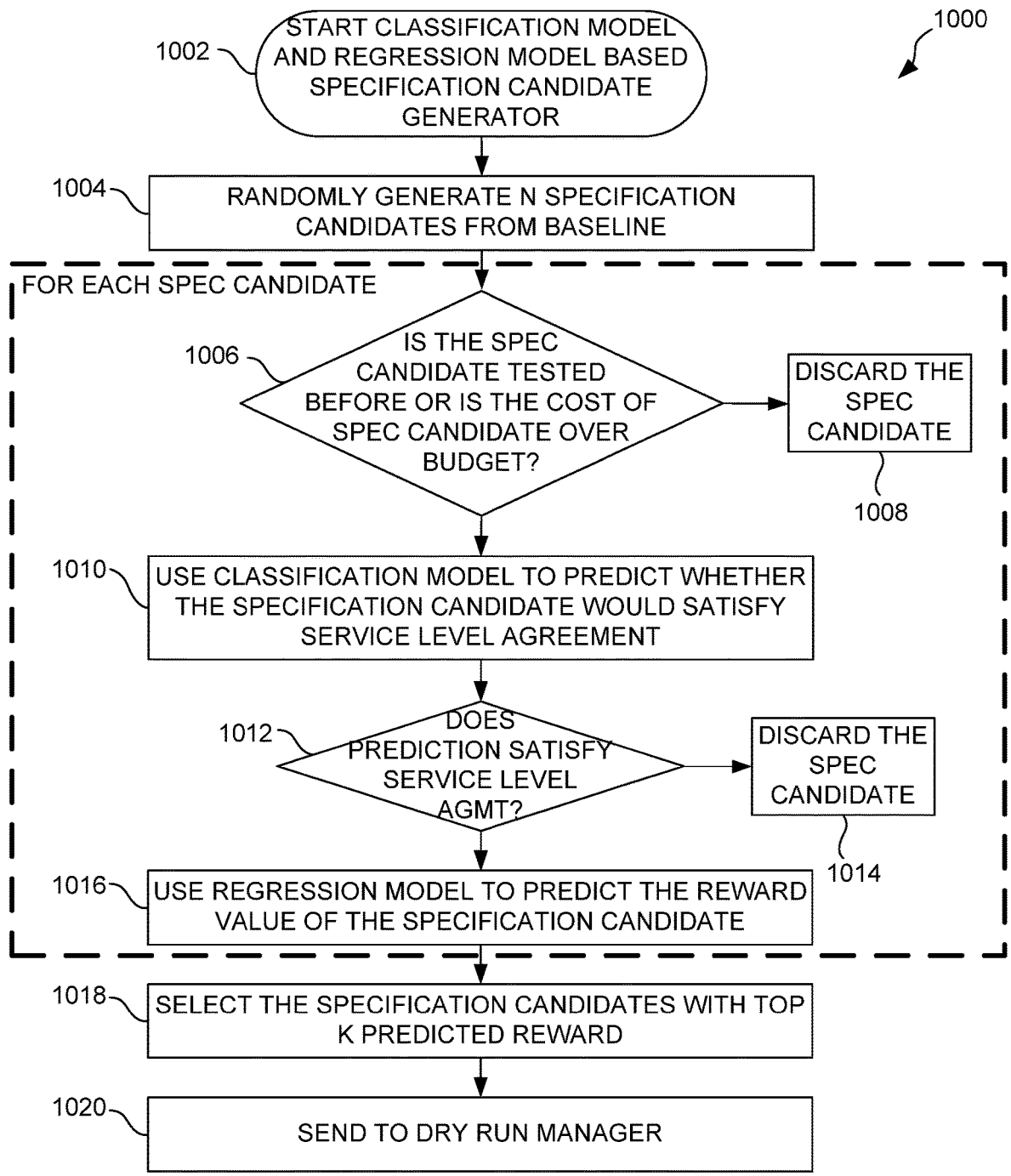
FIG. 10 illustrates a classification/regression-based model method for generating additional application deployment plans, in accordance with another embodiment.

FIG. 10 illustrates a classification/regression-based model method 1000 for generating additional application deployment plans, in accordance with another embodiment. As an option, the method 1000 may be implemented with one or more features of any one or more of the embodiments set forth in any previous and/or subsequent figure(s) and/or the description thereof. For example, in one possible embodiment, the method 1000 may reflect possible operation of the operation 914 of FIG. 9. However, it is to be appreciated that the method 1000 may be implemented in other suitable environments.

As shown, upon starting in operation 1002, a number n of application deployment specification candidates are randomly generated from a baseline application deployment specification in operation 1004. In one embodiment, this may be accomplished by starting with the parameters of the baseline application deployment specification and then stepping up/down randomly-selected parameters by a predetermined (or random) amount. Thereafter, the method 1000 continues to process each application deployment specification candidate, as follows.

Specifically, it is first determined in decision 1006 whether each application deployment specification candidate has been tested before or has an associated cost that exceeds a budget threshold. Such cost may accompany the results of each candidate after a dry run test, for example, and may thus be available for comparison with the aforementioned threshold. Further, a tag or some other tracking mechanism may be used to determine whether the candidate has been tested already. If either condition is met, the application deployment specification candidate is discarded in operation 1008. Otherwise, the method 1000 continues as follows.

In operation 1010, a dry run of the candidate is simulated using the classification model (which is continuously updated based on dry run results), thus providing statistics/scores that may be compared to parameters (e.g. KPIs) of a SLA. By virtue of such comparison, it is determined in decision 1012 whether the classification model predicts that the candidate will satisfy the SLA. If not, the application deployment specification candidate is discarded in operation 1014. Otherwise, the method 1000 continues as follows.

In operation 1016, a dry run of the candidate is simulated using the regression model (which is continuously updated based on dry run results), thus providing statistics/scores in the form of a reward value (e.g. that may be KPI-related). With each candidate thereby associated with an associated reward value, a subset of the candidates of any desired predetermined or configurable number (e.g. 2, 3, 4, 6, 8 . . . N) may be selected in operation 1018, based on such reward value. In other embodiments, other criteria (other than the reward value) may be used. To this end, the selected subset of the candidates may be sent to a dry manager for deployment for testing purposes. See operation 1020.

Figure 11:
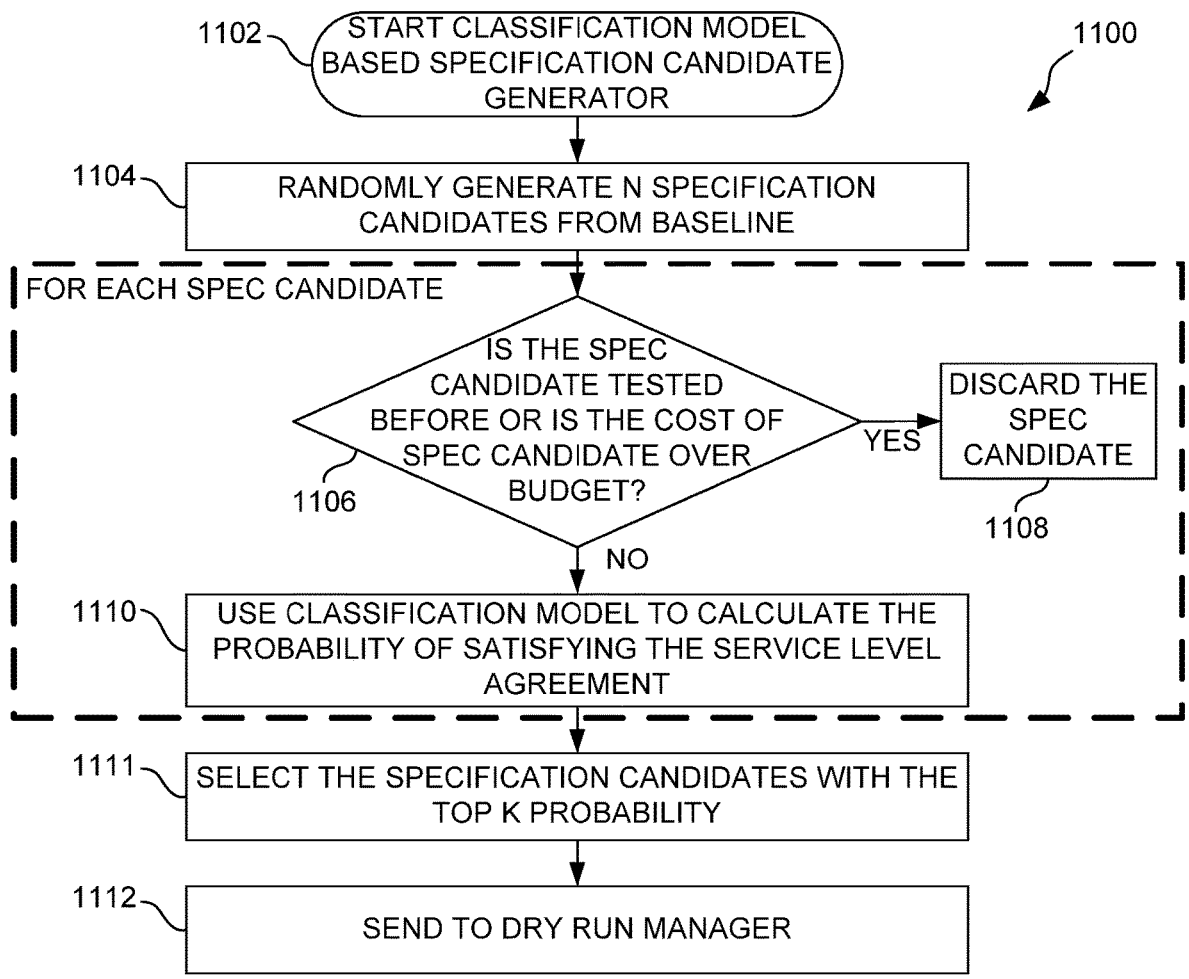
FIG. 11 illustrates a classification-based model method for generating additional application deployment plans, in accordance with another embodiment.

FIG. 11 illustrates a classification-based model method 1100 for generating additional application deployment plans, in accordance with another embodiment. As an option, the method 1100 may be implemented with one or more features of any one or more of the embodiments set forth in any previous and/or subsequent figure(s) and/or the description thereof. For example, in one possible embodiment, the method 1100 may reflect possible operation of the operation 916 of FIG. 9. However, it is to be appreciated that the method 1100 may be implemented in other suitable environments.

As shown, upon starting in operation 1102, a number n of application deployment specification candidates are randomly generated from a baseline application deployment specification in operation 1104. In one embodiment, this may be accomplished similar to operation 1004 of FIG. 10. Next, for each candidate, it is first determined in decision 1106 whether each application deployment specification candidate has been tested before or has an associated cost that exceeds a budget threshold, similar to decision 1006 of FIG. 10. If either condition is met, the application deployment specification candidate is discarded in operation 1108. Otherwise, the method 1100 continues as follows.

In operation 1110, a dry run of the candidate is simulated using the classification model, thus providing statistics/scores that may be compared to parameters (e.g. KPIs) of a SLA. By virtue of such comparison, each candidate is associated with a probability as to whether the candidate will satisfy the SLA. With each candidate thereby associated with an associated probability, a subset of the candidates of any desired predetermined or configurable number (e.g. 2, 3, 4, 6, 8 . . . N) may be selected in operation 1111, based on such probabilities. In other embodiments, other criteria (other than the probabilities) may be used. To this end, the selected subset of the candidates may be sent to a dry manager for deployment for testing purposes. See operation 1112.

FIG. 12 illustrates a gradient-based model method 1200 for generating additional application deployment plans, in accordance with another embodiment. As an option, the method 1200 may be implemented with one or more features of any one or more of the embodiments set forth in any previous and/or subsequent figure(s) and/or the description thereof. For example, in one possible embodiment, the method 1200 may reflect possible operation of the operation 920 of FIG. 9. However, it is to be appreciated that the method 1200 may be implemented in other suitable environments.

As shown, upon starting in operation 1202, a variable i is set to zero (0) in operation 1204 for reasons that will soon become apparent. Subsequent operations then continue iteratively to generate one candidate per pass, and, at each pass, the variable i is incremented. To this end, such operations may continue until it is determined in decision 1206 that a threshold number k of candidates has been generated, in which case, they may be sent to a dry run manager per operation 1208.

As set forth in operation 1210, a random number m of candidates is selected from historical data. Further, in operation 1212, a next candidate is calculated using Equation #1.

Equation #1

$$v_c = v_b + \frac{\alpha}{m} \sum_{l=1}^{m} (v_l - v_b)\tanh(r_l - r_b) \quad \text{Equation (1)}$$

where $v_c$ is a vector of parameters of the generated candidate, $v_b$ is a vector of parameters of the baseline specification, $v_l$ is a vector of parameters of one randomly selected historical specification, $r_l$ is a reward value of one randomly selected historical specification, $r_b$ is a reward value of the baseline specification, m is a number of historical specifications, and $\alpha$ is a learning rate which refers to a rate by which the gradient model is capable of learning.

It is then determined in decision 1214 whether the instant application deployment specification candidate has been tested before or has an associated cost that exceeds a budget threshold, similar to decision 1006 of FIG. 10 and decision 1106 of FIG. 11. If either condition is met, the application deployment specification candidate is discarded in operation 1216. Otherwise, the method 1200 continues by incrementing the variable i in operation 1218 and continuing to decision 1206 as shown.

Figure 13:
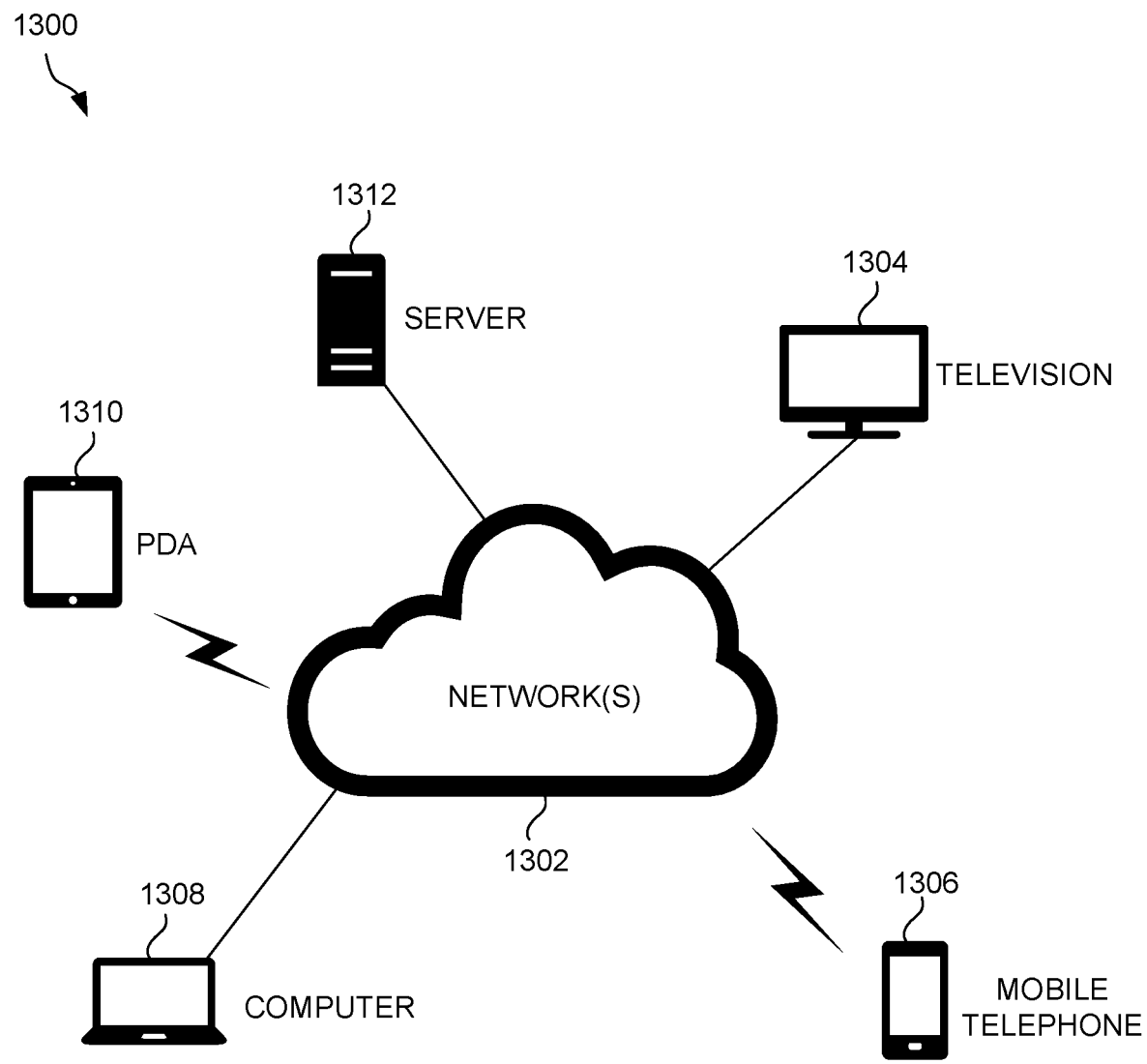
FIG. 13 is a diagram of a network architecture, in accordance with an embodiment.

FIG. 13 is a diagram of a network architecture 1300, in accordance with an embodiment. As shown, at least one network 1302 is provided. In various embodiments, any one or more components/features set forth during the description of any previous figure(s) may be implemented in connection with any one or more of the components of the at least one network 1302.

In the context of the present network architecture 1300, the network 1302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1302 may be provided.

Coupled to the network 1302 is a plurality of devices. For example, a server 1312 and a computer 1308 may be coupled to the network 1302 for communication purposes. Such computer 1308 may include a desktop computer, lap-top computer, and/or any other type of logic. Still yet, various other devices may be coupled to the network 1302 including a personal digital assistant (PDA) device 1310, a mobile phone device 1306, a television 1304, etc.

Figure 14:
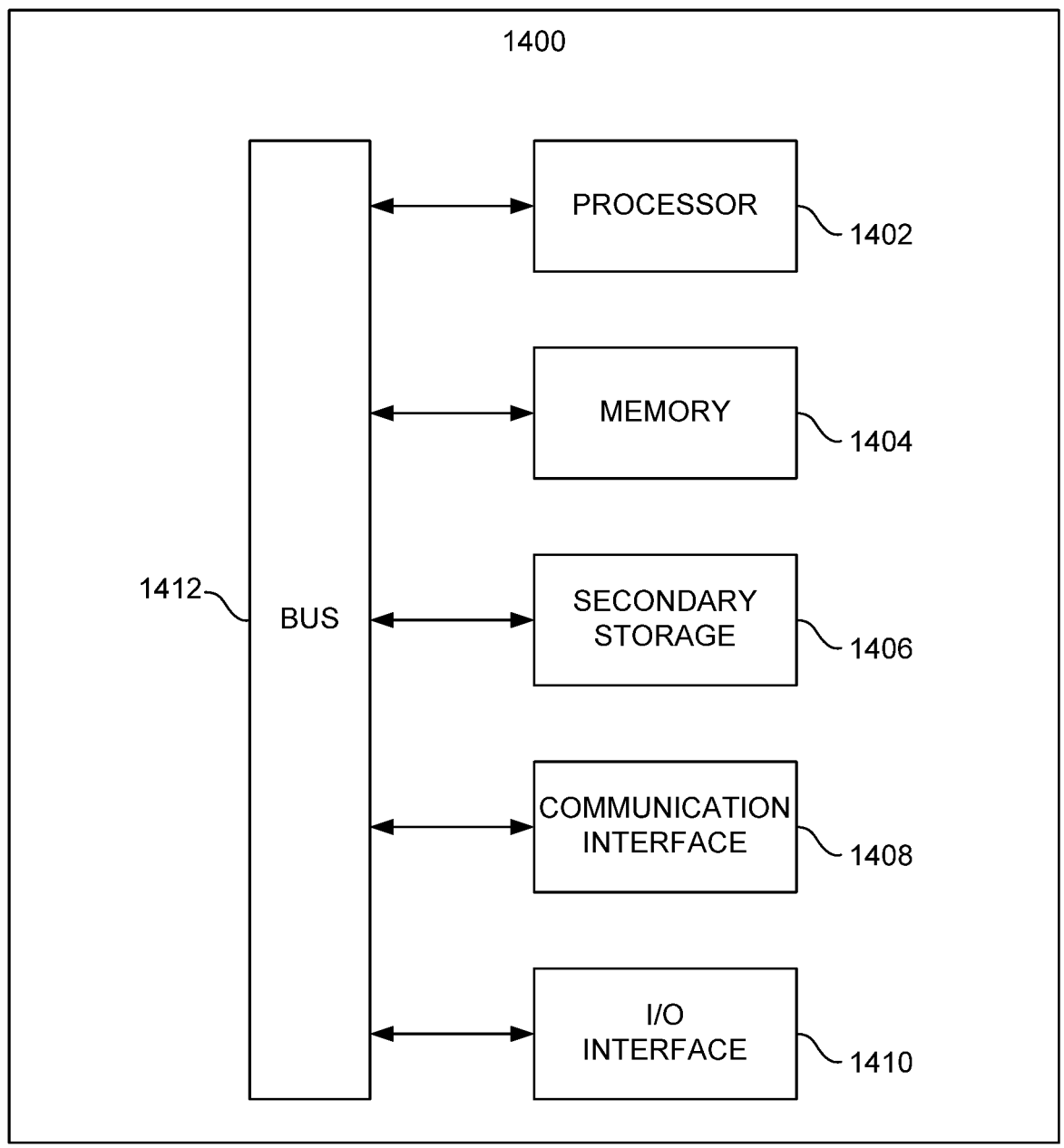
FIG. 14 is a diagram of an exemplary processing device, in accordance with an embodiment.

FIG. 14 is a diagram of an exemplary processing device 1400, in accordance with an embodiment. As an option, the processing device 1400 may be implemented in the context of any of the devices of the network architecture 1300 of FIG. 13. However, it is to be appreciated that the processing device 1400 may be implemented in any desired environment.

As shown, the processing device 1400 includes at least one processor 1402 which is connected to a bus 1412. The processing device 1400 also includes memory 1404 [e.g., hard disk drive, solid state drive, random access memory (RAM), etc.]coupled to the bus 1412. The memory 1404 may include one or more memory components, and may even include different types of memory.

Further included is a communication interface 1408 (e.g. local/remote network interface, memory access interface, etc.) and an input/output (I/O) interface 1410 (e.g. display, speaker, microphone, touchscreen, touchpad, mouse interface, etc.).

The processing device 1400 may also include a secondary storage 1406. The secondary storage 1406 coupled to the bus 1412 and/or to other components of the processing device 1400. The secondary storage 1406 can include, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the memory 1404, the secondary storage 1406, and/or any other memory, for that matter. Such computer programs, when executed, enable the processing device 1400 to perform various functions (as set forth above, for example). Memory 1404, secondary storage 1406 and/or any other storage comprise non-transitory computer-readable media.

In one embodiment, the at least one processor 1402 executes instructions in the memory 1404 or in the secondary storage 1406 to receive an application specification file associated with one or more applications, a plurality of deployment parameters associated with the one or more applications, and a workload profile. Further, an application deployment specification is generated, based on the workload profile and the deployment parameters. Still yet, a type of one or more orchestrators on one or more systems is identified. The application deployment specification is processed, based on the identified type of the one or more orchestrators on the one or more systems. Further, the one or more applications are deployed, via an API, to the one or more orchestrators on at least one of the one or more systems, and at least one workload generator to at least one of the one or more systems, utilizing the processed application deployment specification. Operational data is collected from one or more monitoring agents on the one or more systems. One or more statistics are generated for assessing the deployment of the one or more applications, based on the operational data.

Optionally, in any of the preceding embodiments, the one or more orchestrators on the one or more systems may include a first orchestrator of a first type on a first system and a second orchestrator of a second type on a second system. As an option, the application deployment specification may be processed to accommodate differences between the first orchestrator and the second orchestrator.

Optionally, in any of the preceding embodiments, the application deployment specification may be validated, where the application deployment specification is conditionally deployed based on the validation.

Optionally, in any of the preceding embodiments, the deployment of the one or more applications may be validated, based on the one or more statistics.

Optionally, in any of the preceding embodiments, an additional application deployment specification may be generated. Further, the additional application deployment specification may be deployed for generating an additional one or more statistics for comparison with the one or more statistics.

Optionally, in any of the preceding embodiments, the one or more statistics may be aggregated into a single score for assessing the deployment of the one or more applications.

Optionally, in any of the preceding embodiments, a plurality of the application deployment specifications may be generated, based on the application deployment specification. Further, a subset of the plurality of the application deployment specifications may be selected. Still yet, the subset of the plurality of the application deployment specifications may be deployed, for generating a first set of the one or more statistics in connection therewith.

Optionally, in any of the preceding embodiments, additional deployment specifications may also be generated, based on the one or more statistics. Further, a subset of the additional deployment specifications may be selected, such that the subset of the additional deployment specifications may be deployed, for generating a second set of the one or more statistics.

Optionally, in any of the preceding embodiments, it may be determined whether a similarity in connection with the first set of the one or more statistics and the second set of the one or more statistics, is within a predetermined threshold. In an event that it is determined that the similarity is within the predetermined threshold, a deployment specification recommendation may be made to a user.

Optionally, in any of the preceding embodiments, the deployment specification recommendation may include a portion of: the subset of the plurality of the application deployment specifications, and/or the subset of the additional deployment specifications.

Optionally, in any of the preceding embodiments, the plurality of the application deployment specifications may be generated based on one or more models. As various options, the one or more modules may include: a combination of a classification model and a regression model, a classification model, a gradient-based model, and/or a neighborhood-based model Optionally, in any of the preceding embodiments, the one or more models may be trained, utilizing at least a portion of the one or more statistics.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), or the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; or the like.

Computer-readable non-transitory media includes all types of computer readable media, including magnetic storage media, optical storage media, and solid state storage media and specifically excludes signals. It should be understood that the software can be installed in and sold with the devices described herein. Alternatively the software can be obtained and loaded into the devices, including obtaining the software via a disc medium or from any manner of network or distribution system, including, for example, from a server owned by the software creator or from a server not owned but used by the software creator. The software can be stored on a server for distribution over the Internet, for example.

It should be understood that the arrangement of components illustrated in the Figures described are exemplary and that other arrangements are possible. It should also be understood that the various system components defined by the claims, described below, and illustrated in the various block diagrams represent logical components in some systems configured according to the subject matter disclosed herein.

For example, one or more of these system components may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method, comprising:
   receiving an application specification file associated with one or more applications, a plurality of deployment parameters associated with the one or more applications, and a workload profile;
   generating an application deployment specification, based on the application specification file, the deployment parameters, and the workload profile;
   identifying a type of one or more orchestrators on one or more systems, each orchestrator identifying an amount of resources at said one or more systems and allocating resources at said one or more systems for application deployment by matching resources requirements of the one or more applications with resource availability of the one or more systems;
   processing the application deployment specification based on the identified type of the one or more orchestrators on the one or more systems to tailor the application deployment specification to the different types of orchestrators;
   deploying, via an application program interface (API), the one or more applications to the one or more orchestrators on at least one of the one or more systems, and at least one workload generator to at least one of the one or more systems, wherein the one or more applications are deployed to the one or more orchestrators by type of orchestrator determined utilizing the processed application deployment specification;
   collecting operational data from one or more monitoring agents on the one or more systems; and
   generating one or more statistics for assessing the deployment of the one or more applications, based on the operational data.

2. The method of claim 1, wherein the one or more orchestrators include a first orchestrator of a first type on a first system and a second orchestrator of a second type on a second system.

3. The method of claim 2, wherein the application deployment specification is configured for deploying the one or more applications to the first orchestrator and the second orchestrator differently to accommodate differences between the first orchestrator and the second orchestrator.

4. The method of claim 1, and further comprising:
   validating the application deployment specification, where the application deployment specification is conditionally deployed based on the validation.

5. The method of claim 1, and further comprising:
   validating the deployment of the one or more applications, based on the one or more statistics.

6. The method of claim 1, and further comprising:
   generating an additional application deployment specification; and
   deploying the additional application deployment specification for generating an additional one or more statistics for comparison with the one or more statistics.

7. The method of claim 1, and further comprising:
   aggregating the one or more statistics into a single score for assessing the deployment of the one or more applications.

8. The method of claim 1, and further comprising:
   generating a plurality of the application deployment specifications, based on the application deployment specification; and
   selecting a subset of the plurality of the application deployment specifications; and
   deploying the subset of the plurality of the application deployment specifications, for generating a first set of the one or more statistics in connection therewith.

9. The method of claim 8, and further comprising:
   generating additional deployment specifications, based on the one or more statistics;
   selecting a subset of the additional deployment specifications; and
   deploying the subset of the additional deployment specifications, for generating a second set of the one or more statistics.

10. The method of claim 9, and further comprising:
    determining whether a similarity in connection with the first set of the one or more statistics and the second set of the one or more statistics, is within a predetermined threshold; and in an event that it is determined that the similarity is within the predetermined threshold, making a deployment specification recommendation to a user.

11. The method of claim 10, wherein the deployment specification recommendation includes a portion of at least one of the subset of the plurality of the application deployment specifications, or the subset of the additional deployment specifications.

12. The method of claim 8, wherein the plurality of the application deployment specifications are generated based on one or more models.

13. The method of claim 12, wherein the one or models include at least one of a combination of a classification model and a regression model, the classification model, a gradient-based model, or a neighborhood-based model.

14. The method of claim 12, and further comprising:
training the one or more models, utilizing at least a portion of the one or more statistics.

15. A processing device, comprising:
a non-transitory memory storing instructions; and
one or more processors in communication with the non-transitory memory, wherein the one or more processors execute the instructions to:
receive a plurality of deployment parameters associated with one or more applications, and a workload profile;
generate an application deployment specification, based on the workload profile and the deployment parameters;
identify a type of one or more orchestrators on one or more systems, each orchestrator identifying an amount of resources at said one or more systems and allocating resources at said one or more systems for application deployment by matching resources requirements of the one or more applications with resource availability of the one or more systems;
process the application deployment specification based on the identified type of the one or more orchestrators on the one or more systems to tailor the application deployment specification to the different types of orchestrators;
deploy, via an application program interface (API), the one or more applications to the one or more orchestrators on at least one of the one or more systems, and at least one workload generator to at least one of the one or more systems, wherein the one or more applications are deployed to the one or more orchestrators by type of orchestrator determined utilizing the processed application deployment specification;
collect operational data from one or more monitoring agents on the one or more systems; and
generate one or more statistics for assessing the deployment of the one or more applications, based on the operational data.

16. The processing device of claim 15, wherein the one or more orchestrators on the one or more systems include a first orchestrator of a first type on a first system and a second orchestrator of a second type on a second system.

17. The processing device of claim 16, wherein the application deployment specification is processed to accommodate differences between the first orchestrator and the second orchestrator.

18. The processing device of claim 15, wherein the one or more processors execute the instructions to:
validate the application deployment specification, where the application deployment specification is conditionally deployed based on the validation.

19. The processing device of claim 15, wherein the one or more processors execute the instructions to:
validate the deployment of the one or more applications, based on the one or more statistics.

20. The processing device of claim 15, wherein the one or more processors execute the instructions to:
generate an additional application deployment specification; and
deploy the additional application deployment specification for generating an additional one or more statistics for comparison with the one or more statistics.

21. The processing device of claim 15, wherein the one or more processors execute the instructions to:
aggregate the one or more statistics into a single score for assessing the deployment of the one or more applications.

22. The processing device of claim 15, wherein the one or more processors execute the instructions to:
generate a plurality of the application deployment specifications, based on the application deployment specification; and
select a subset of the plurality of the application deployment specifications; and
deploy the subset of the plurality of the application deployment specifications, for generating a first set of the one or more statistics in connection therewith.

23. The processing device of claim 22, wherein the one or more processors execute the instructions to:
generate additional deployment specifications, based on the one or more statistics;
select a subset of the additional deployment specifications; and
deploy the subset of the additional deployment specifications, for generating a second set of the one or more statistics.

24. The processing device of claim 23, wherein the one or more processors execute the instructions to:
determine whether a similarity in connection with the first set of the one or more statistics and the second set of the one or more statistics, is within a predetermined threshold; and
in an event that it is determined that the similarity is within the predetermined threshold, make a deployment specification recommendation to a user.

25. The processing device of claim 24, wherein the deployment specification recommendation includes a portion of at least one of the subset of the plurality of the application deployment specifications, or the subset of the additional deployment specifications.

26. The processing device of claim 22, wherein the plurality of the application deployment specifications are generated based on one or more models.

27. The processing device of claim 26, wherein the one or models include a combination of a classification model and a regression model.

28. The processing device of claim 26, wherein the one or models include a classification model.

29. The processing device of claim 26, wherein the one or models include a gradient-based model.

30. The processing device of claim 26, wherein the one or models include a neighborhood-based model.

31. The processing device of claim 26, wherein the one or more processors execute the instructions to:
train the one or more models, utilizing at least a portion of the one or more statistics.

32. A non-transitory computer-readable media storing computer instructions that when executed by one or more processors, cause the one or more processors to perform the steps of:

receiving an application specification file associated with one or more applications, a plurality of deployment parameters associated with the one or more applications, and a workload profile;

generating an application deployment specification, based on the application specification file, the deployment parameters, and the workload profile;

identifying a type of one or more orchestrators on one or more systems, each orchestrator identifying an amount of resources at said one or more systems and allocating resources at said one or more systems for application deployment by matching resources requirements of the one or more applications with resource availability of the one or more systems;

processing the application deployment specification based on the identified type of the one or more orchestrators on the one or more systems to tailor the application deployment specification to the different types of orchestrators;

deploying, via an application program interface (API), the one or more applications to the one or more orchestrators on at least one of the one or more systems, and at least one workload generator to at least one of the one or more systems, wherein the one or more applications are deployed to the one or more orchestrators by type of orchestrator determined utilizing the processed application deployment specification;

collecting operational data from one or more monitoring agents on the one or more systems; and generating one or more statistics for assessing the deployment of the one or more applications, based on the operational data.

* * * * *